(12) United States Patent
Beatty et al.

(10) Patent No.: US 9,310,840 B2
(45) Date of Patent: Apr. 12, 2016

(54) SYSTEMS, METHODS, AND APPARATUS FOR DOCKING A HANDHELD DEVICE

(71) Applicant: FIRST DATA CORPORATION, Greenwood Village, CO (US)

(72) Inventors: John Beatty, Mountain View, CA (US); Leonard Speiser, Mountain View, CA (US); Eric Fuhs, Mountain View, CA (US); David Lyons, Mountain View, CA (US); Chris Loew, Mountain View, CA (US); Scott McKinley DeWinter, Oakland, CA (US); Justin Michael Beck, Palo Alto, CA (US); Todd Elliot Lewis, Corvallis, OR (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 101 days.

(21) Appl. No.: 14/192,577

(22) Filed: Feb. 27, 2014

(65) Prior Publication Data

US 2015/0241919 A1 Aug. 27, 2015

(51) Int. Cl.
*G06F 1/16* (2006.01)
*F16M 11/12* (2006.01)
*F16M 13/00* (2006.01)
*H04M 1/04* (2006.01)

(52) U.S. Cl.
CPC ............ *G06F 1/1632* (2013.01); *F16M 11/125* (2013.01); *F16M 13/00* (2013.01); *F16M 2200/024* (2013.01); *H04M 1/04* (2013.01)

(58) Field of Classification Search
CPC .................................................. G06F 1/1632
See application file for complete search history.

(56) References Cited

U.S. PATENT DOCUMENTS

| | | | |
|---|---|---|---|
| 4,948,181 A | 8/1990 | Pritchard | |
| 6,101,087 A * | 8/2000 | Sutton et al. | 361/679.44 |
| 6,447,451 B1 * | 9/2002 | Wing et al. | 600/437 |
| 7,567,431 B2 * | 7/2009 | Brooks et al. | 361/679.06 |
| 7,930,006 B2 * | 4/2011 | Neu et al. | 455/575.1 |
| 8,159,818 B2 * | 4/2012 | Riddiford | 361/679.41 |
| 8,250,278 B2 * | 8/2012 | Tseng et al. | 710/303 |
| 8,821,173 B2 * | 9/2014 | Carnevali | 439/248 |
| 8,988,862 B2 * | 3/2015 | Yuen | 361/679.02 |
| 9,019,698 B2 * | 4/2015 | Thiers | 361/679.3 |
| 2003/0193772 A1 | 10/2003 | Thomason | |

(Continued)

OTHER PUBLICATIONS

International Search Report and Written Opinion for International Application No. PCT/US2014/071111 mailed Apr. 13, 2015, European Patent Office.

(Continued)

*Primary Examiner* — Lisa Lea Edmonds
(74) *Attorney, Agent, or Firm* — Sutherland Asbill & Brennan LLP

(57) ABSTRACT

A docking assembly for a handheld device comprising a handle and associated methods are disclosed herein. The docking assembly may include a base, a tube extending from the base, and a dock cup in rotatable communication with the tube. The dock cup may be configured to mate with the handle. The docking assembly also may include an electrical connection assembly configured to mate with the handle when the handle is positioned within the dock cup. Moreover, the docking assembly may include a first locking assembly configured to lock the handle in the dock cup to prevent the handle from being removed from the dock cup, and a second locking assembly configured to lock the orientation of the dock cup to prevent rotation of the dock cup.

18 Claims, 26 Drawing Sheets

(56) References Cited

U.S. PATENT DOCUMENTS

| | | | |
|---|---|---|---|
| 2008/0266783 A1* | 10/2008 | Mills et al. | 361/686 |
| 2010/0055964 A1* | 3/2010 | Hayashi et al. | 439/367 |
| 2010/0200719 A1 | 8/2010 | Ehrman et al. | |
| 2011/0006174 A1* | 1/2011 | Hollinger | 248/176.1 |
| 2011/0073658 A1 | 3/2011 | Vassura et al. | |
| 2011/0099392 A1* | 4/2011 | Conway | 713/300 |
| 2013/0187020 A1* | 7/2013 | Trotsky | 248/309.3 |
| 2013/0257570 A1 | 10/2013 | Bandy | |

OTHER PUBLICATIONS

"The Self-Clinching Fastener Handbook," Mar. 14, 2006, XP055178729, Retrieved from the Internet: URL:https://web.archive.org/web/20060314194526/http://www.pemnet.com/fastening_products/pdf/Handbook.pdf [retrieved on Mar. 24, 2015], p. 12-p. 13.

Anonymous: "Spring Contact Technology for Test & Measurement," Jul. 10, 2013, XP055177058, Retrieved from the Internet: URL:http://www.connectorsupplier.com/spring-contact-test-and-measurement-crisp-060413/ [retrieved on Mar. 17, 2015].

\* cited by examiner

SYSTEMS, METHODS, AND APPARATUS FOR DOCKING A HANDHELD DEVICE

FIELD OF THE DISCLOSURE

The disclosure generally relates to docking assemblies and more particularly relates to systems, methods, and apparatus for docking a handheld device.

BACKGROUND

Docking assemblies may be used to dock handheld devices. Conventional docking assemblies, however, may not provide sufficient stability when the handheld device is docked, and when users are tapping on the display of the handheld device. Moreover, conventional docking assemblies may not enable a handheld device to be positioned in certain orientations. That is, conventional docking assemblies may provide inadequate stability, maneuverability, and/or configurability.

SUMMARY

Some or all of the above needs and/or problems may be addressed by certain embodiments of the docking assembly disclosed herein. According to an embodiment, a docking assembly for a handheld device with a handle may include a base, a tube extending from the base, and a dock cup in rotatable communication with the tube. The dock cup may be configured to mate with the handle. The docking assembly also may include an electrical connection assembly configured to mate with the handle when the handle is positioned within the dock cup. Moreover, the docking assembly may include a first locking assembly configured to lock the handle in the dock cup to prevent the handle from being removed from the dock cup, and a second locking assembly configured to lock the orientation of the dock cup to prevent rotation of the dock cup.

Other features and aspects of the docking assembly will be apparent or will become apparent to one with skill in the art upon examination of the following figures and the detailed description. All other features and aspects, as well as other systems, methods, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
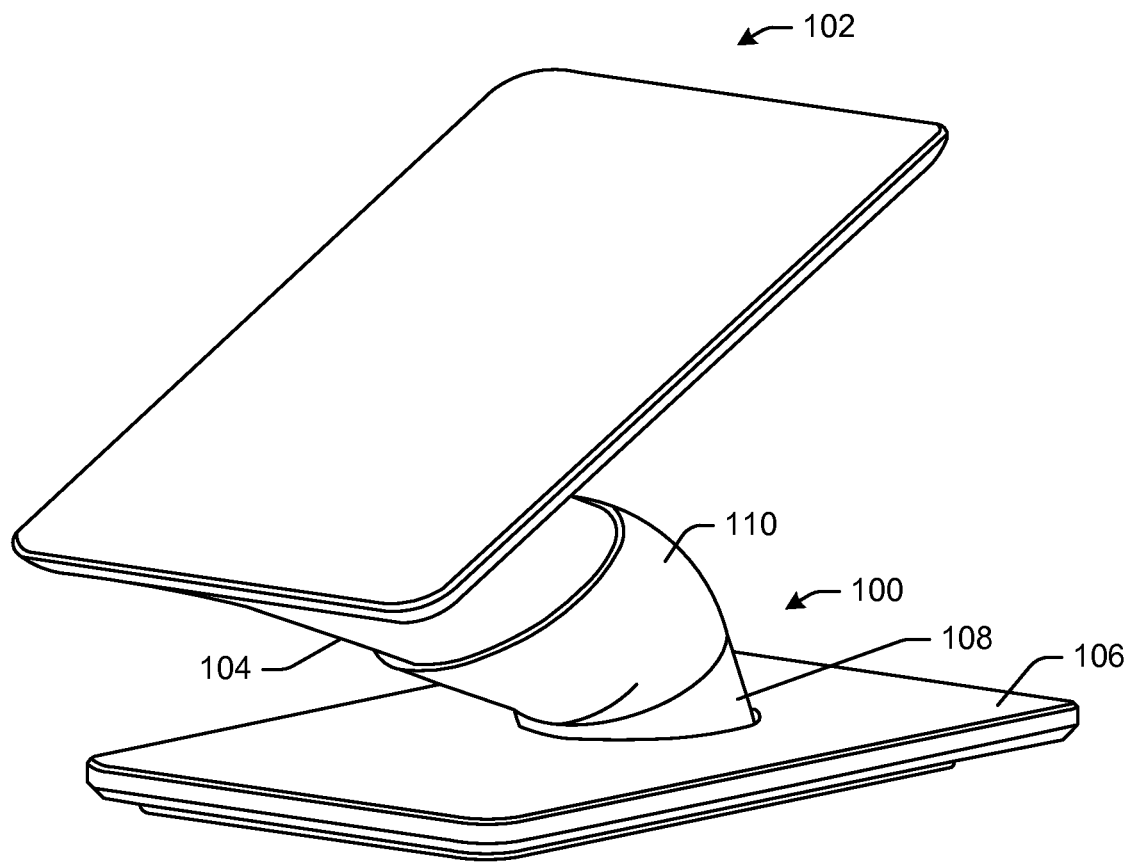
FIG. 1 schematically depicts a docking assembly in accordance with one or more embodiments of the disclosure.

Described below are embodiments of a docking assembly (as well as individual components of a docking assembly) for docking a handheld device. Methods of manufacturing, installing, and/or using a docking assembly are also disclosed. In some instances, the handheld device may include a handle.

The handheld device may be any mobile computing device. In some instances, the handheld device may include a display. For example, the handheld device may be a tablet. The handheld device may be any type of computing device including, but not limited to, a laptop, a mobile phone, a smart phone, a personal digital assistant (PDA), a game console, a wearable computer, an e-reader, a web-enabled device, a cloud-enabled device, or the like. In some instances, the handheld device may be used as a point-of-sale device, an inventory device, a bar code (or QR) reader, a kiosk, a printer, or the like. The handheld device may be used for any suitable purpose.

Certain embodiments of the docking assembly may provide the technical effect and/or solution of enabling the handheld device to be positioned in various portrait and landscape orientations when mounted on a surface, such as a counter or a wall. Moreover, the docking assembly may provide stability to the handheld device while users tap on the display. In some instances, the handheld device may be cinched into the docking assembly to provide stability during insertion and removal of the handheld device from the docking assembly. The docking assembly may include an electrical connection with the handheld device when docked therein. In certain embodiments, the orientation of the docking assembly may be locked in place to fix the position of the handheld device. In other instances, the handheld device may be locked (or attached) to the docking assembly so that it cannot be removed from the docking assembly. In certain embodiments, the docking assembly may include a bracket for securely mounting the docking assembly to a surface, such as a counter or a wall. Other technical effects and/or solutions may become apparent throughout the disclosure.

Generally speaking, the docking assembly may include a base, a tube extending from the base, and a dock cup in rotatable communication with the tube. The dock cup may be configured to mate with the handle of the handheld device. That is, the handle may be inserted and removed from the dock cup.

To facilitate rotation of the dock cup, a lip may be disposed about an inner portion of the tube. A dock plate may be attached to the dock cup, and a dock stem may be attached to the dock plate. The dock plate and the dock stem may be positioned about the lip to form a bearing surface for the dock cup to rotate. In some instances, to limit the rotation of the dock cup, a stop block may be disposed in the tube. In this manner, the dock stem may include a tab configured to engage the stop block to limit rotation of the dock cup.

A tactile dent assembly may create a tactile dent when the dock cup is rotated to one or more distinct orientations. For example, at least one spring plunger may be attached to the dock plate. In addition, the tube may include at least one notch configured to mate with the at least one spring plunger to create a tactile dent when the dock cup is rotated to one or more distinct orientations.

The dock cup may include one or more skid pads disposed therein to stabilize the handle in the dock cup. Moreover, the handle may be cinched into the dock cup to provide stability during insertion and removal of the handle from the dock cup. For example, a cinching magnet may be disposed against the dock plate within the dock cup. The handle may include a magnetic material. The magnetic material may be configured to engage the cinching magnet when the handle is positioned within the dock cup to stabilize the handle in the dock cup. To facilitate disengaging the magnetic material from the cinching magnet, a thin material may be disposed between the cinching magnet and the magnetic material.

The docking assembly may include an electrical connection assembly configured to mate with the handle when the handle is positioned within the dock cup. In some instances, the electrical connection assembly may include a fixed electrical connection disposed within the dock cup. At least one wiping spring contact may be disposed on a side of the fixed electrical connection. Moreover, a flexible printed circuit may be in communication with the fixed electrical connection. The flexible printed circuit may extend from the fixed electrical connection, into and around the dock stem, through a window in a toggle knob, and into the tube. In some instances, the flexible printed circuit may include at least one loop about the dock stem for managing the flexible printed circuit during rotation of the dock cup. For example, the loop may expand and contract the flexible printed circuit as the dock cup rotates.

The docking assembly may include a first locking assembly configured to lock the handle in the dock cup to prevent the handle from being removed from the dock cup. The first locking assembly may include a latch pivotally attached to the dock stem. The latch may include a locked position and an unlocked position. A spring pin may be disposed within the dock stem and in communication with the latch. The spring pin may be configured to bias the latch in the locked position. A toggle knob may be in rotatable communication with the dock stem. The toggle knob may include a cam surface in communication with the latch. In this manner, rotation of the toggle knob may move the latch between the locked position and the unlocked position. The handle may include a slot configured to engage the latch in the locked position.

In some instances, the first locking assembly may include a tactile dent assembly to create a tactile dent when the toggle knob is rotated between the locked position and the unlocked position. The tactile dent assembly may include a ball plunger disposed in the dock stem. At least one notch in the toggle knob may be configured to mate with the at least one ball plunger to create a tactile dent between the locked position and the unlocked position.

The docking assembly also may include a second locking assembly configured to lock the orientation of the dock cup to prevent rotation of the dock cup. In some instances, the second locking assembly may include at least one captive screw disposed in the tube. The at least one captive screw may include a locked position to prevent rotation of the dock cup and an unlocked position where the dock cup is rotatable about the tube. At least one hole in the dock plate may be configured to receive the at least one captive screw when in the locked position. In some instances, a captive screw spring may be configured to bias the at least one captive screw in the unlocked position.

To mount the docking assembly to a surface, such as a counter or a wall, the docking assembly may include a cover plate attached to the base. The base may include at least one cavity formed therein. The cover plate may form an undercut about the at least one cavity. A bracket comprising at least one clip protrusion may be configured to mate with the at least one cavity and the undercut. A bracket spring clip may be configured to cinch the base to the bracket. In some instances, the at least one cavity and the at least one clip protrusion may include corresponding angled walls for aligning the base and the bracket. Moreover, the base may include at least one notch, and the bracket may include at least one flexure beam having at least one dent. The at least one dent may be configured to mate with the at least one notch. In addition, at least one set screw may be configured to fasten the base to the bracket.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

Figure 2:
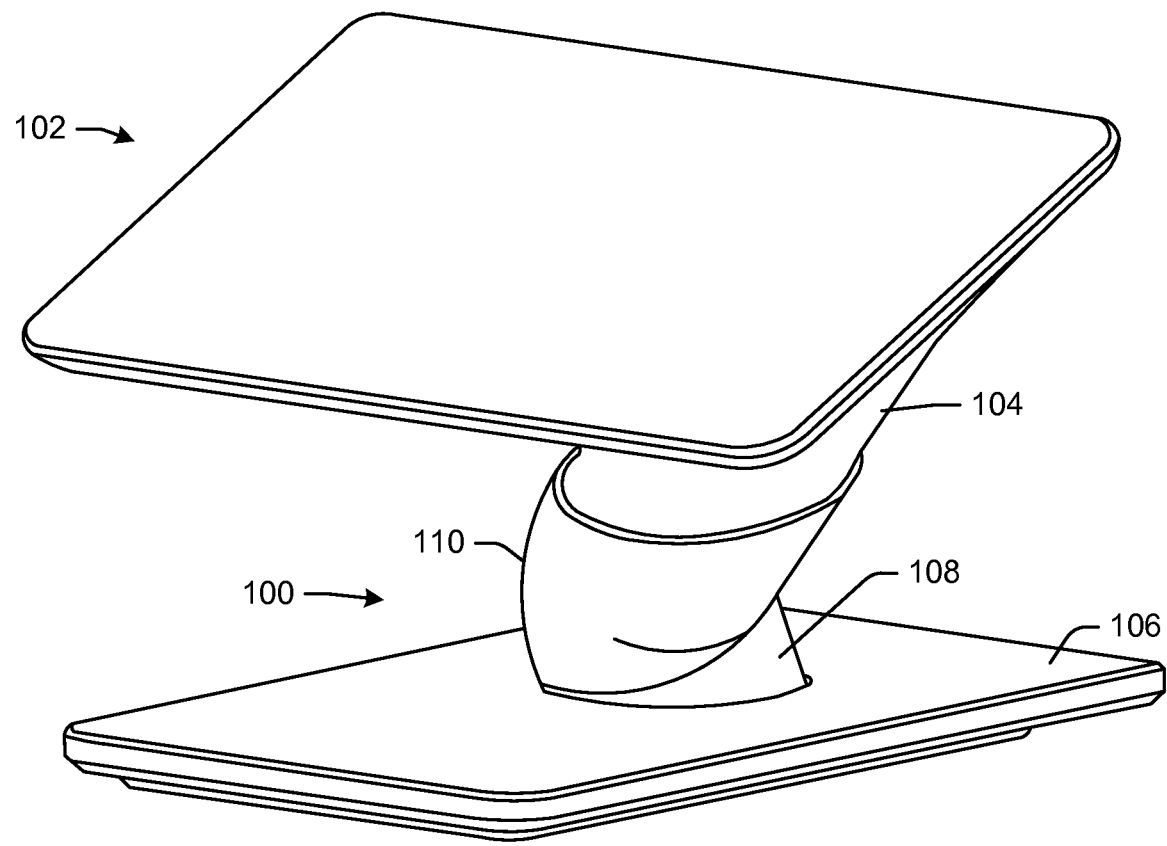
FIG. 2 schematically depicts a docking assembly in accordance with one or more embodiments of the disclosure.
Figure 3:
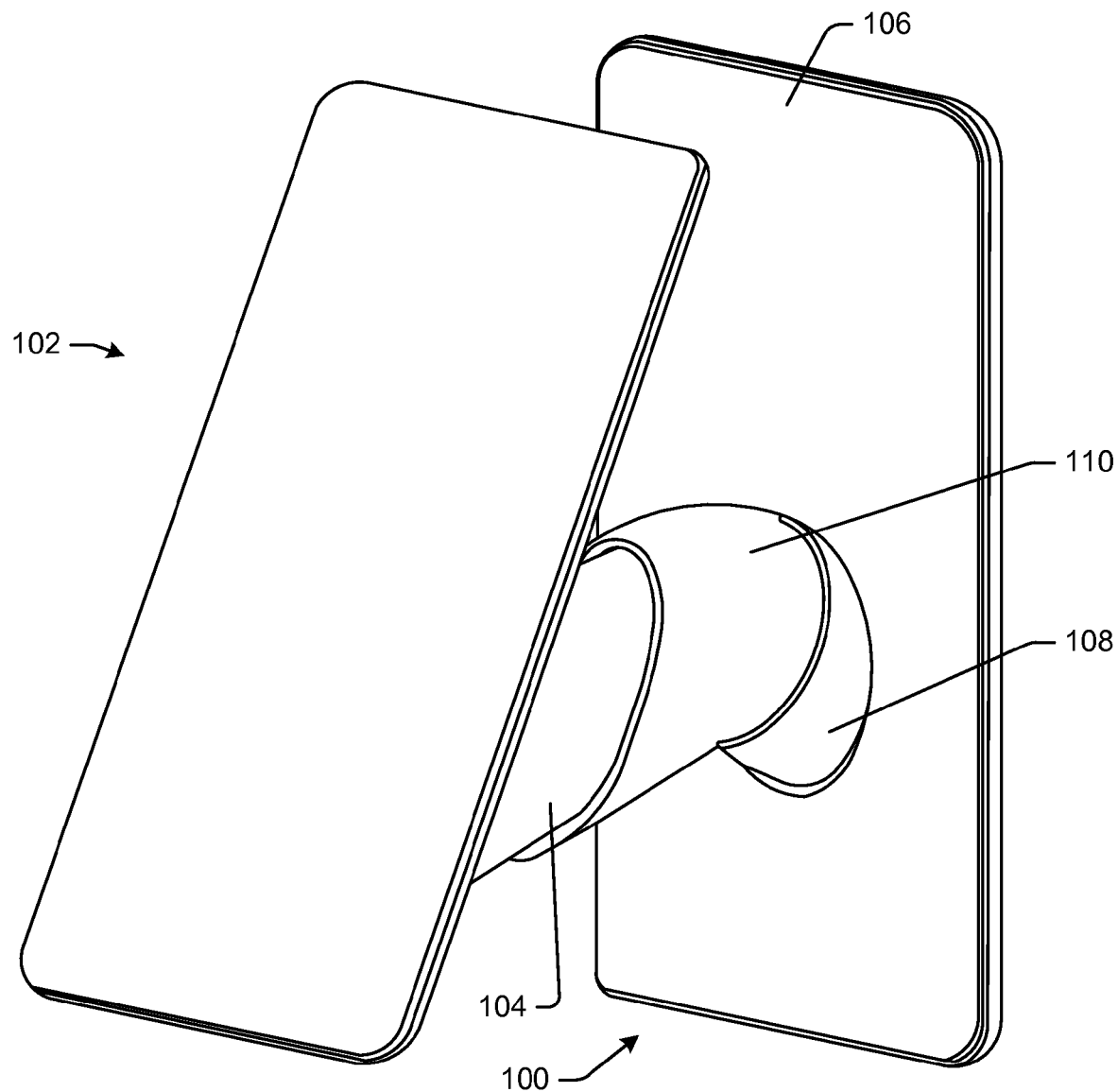
FIG. 3 schematically depicts a portion of a docking assembly in accordance with one or more embodiments of the disclosure.
Figure 4:
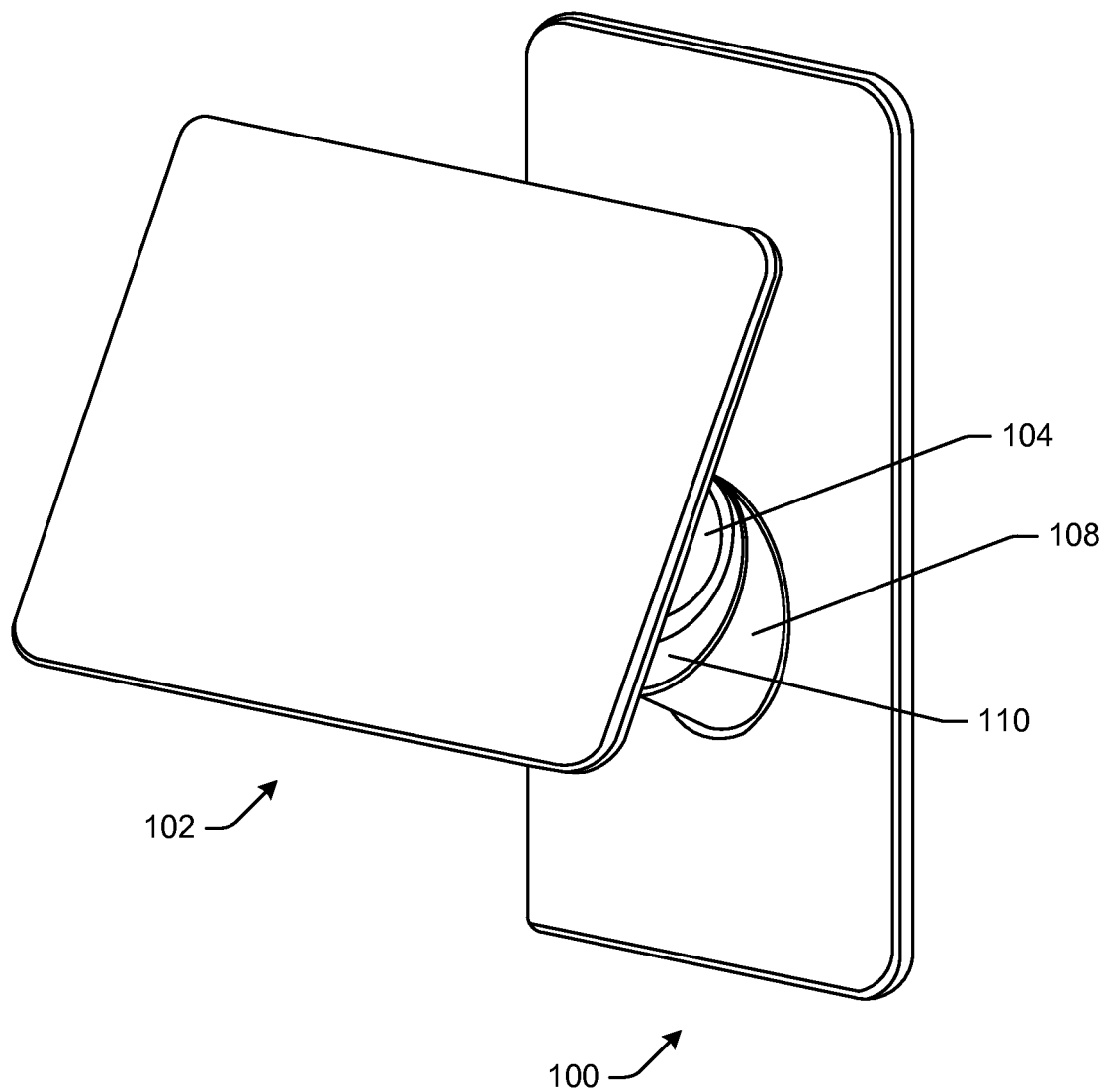
FIG. 4 schematically depicts a portion of a docking assembly in accordance with one or more embodiments of the disclosure.

FIGS. 1-25 schematically depict various embodiments of a docking assembly 100 (as well as individual components of the docking assembly 100) for docking a handheld device 102 in accordance with one or more embodiments of the disclosure. The docking assembly 100 may be configured to dock the handheld device 102 in various portrait and landscape orientations when mounted on a surface, such as a counter or a wall. For example, FIG. 1 depicts the docking assembly 100 mounted on a horizontal surface, such as a counter, with the handheld device 102 in a portrait orientation. FIG. 2 depicts the docking assembly 100 mounted on a horizontal surface, such as a counter, with the handheld device 102 in a landscape orientation. FIG. 3 depicts the docking assembly 100 mounted on a vertical surface, such as a wall, with the handheld device 102 in a portrait orientation. FIG. 4 depicts the docking assembly 100 mounted on a vertical surface, such as a wall, with the handheld device 102 in a landscape orientation. The handheld device 102 may be positioned in other orientations. That is, the handheld device 102 may be positioned at any angle relative to the docking assembly 100.

In some instances, the handheld device 102 may include a handle 104. The handle 104 may be used to hold the handheld device 102. Moreover, the handle 104 may be used to dock the handheld device 102 within the docking assembly 100. For example, the docking assembly 100 may include a base 106, a tube 108 extending from the base 106, and a dock cup 110 in rotatable communication with the tube 108. The dock cup 110 may be configured to mate with the handle 104. That is, the handle 104 may be inserted and removed from the dock cup 110.

Figure 5:
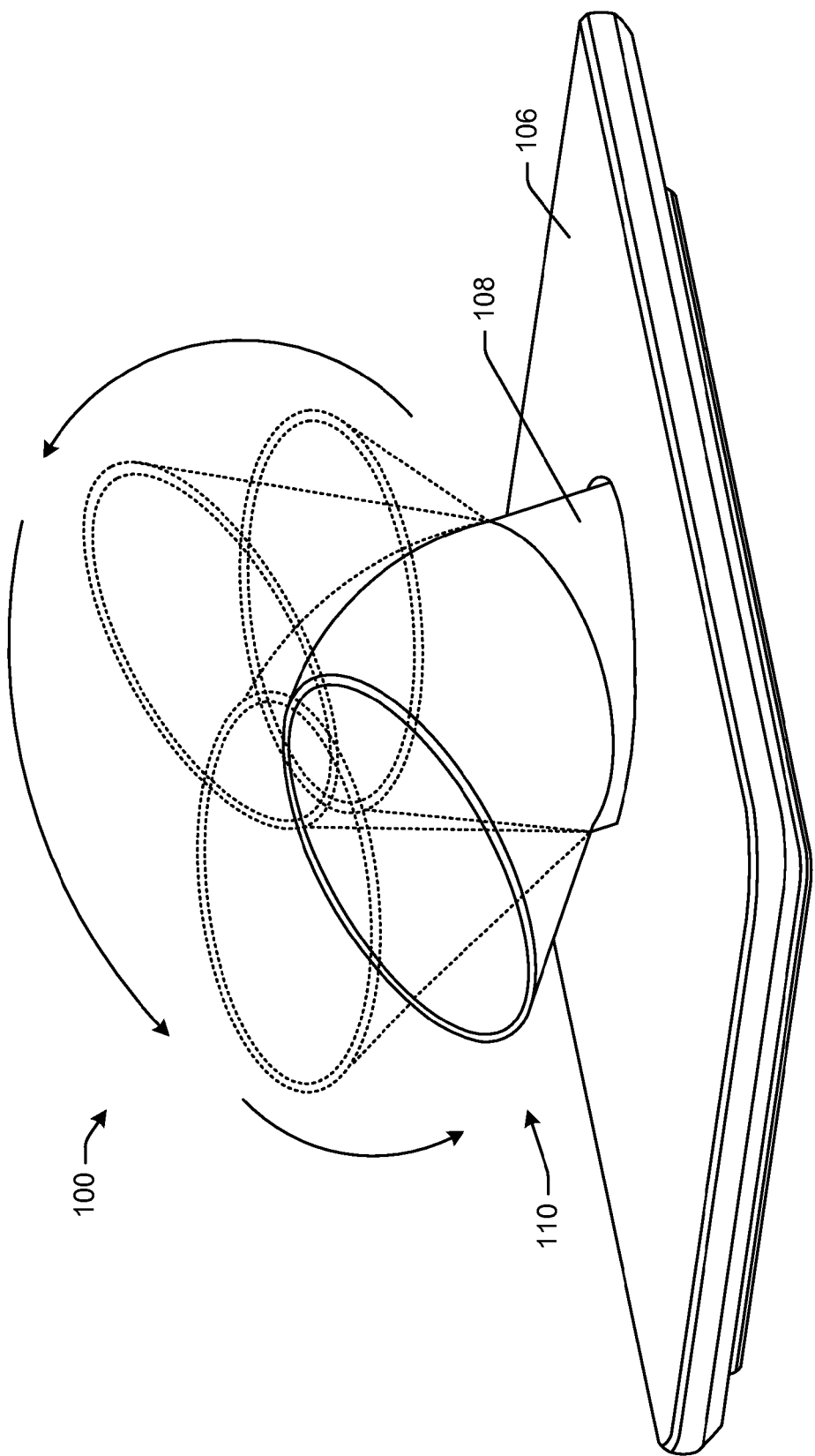
FIG. 5 schematically depicts a portion of a docking assembly in accordance with one or more embodiments of the disclosure.
Figure 6:
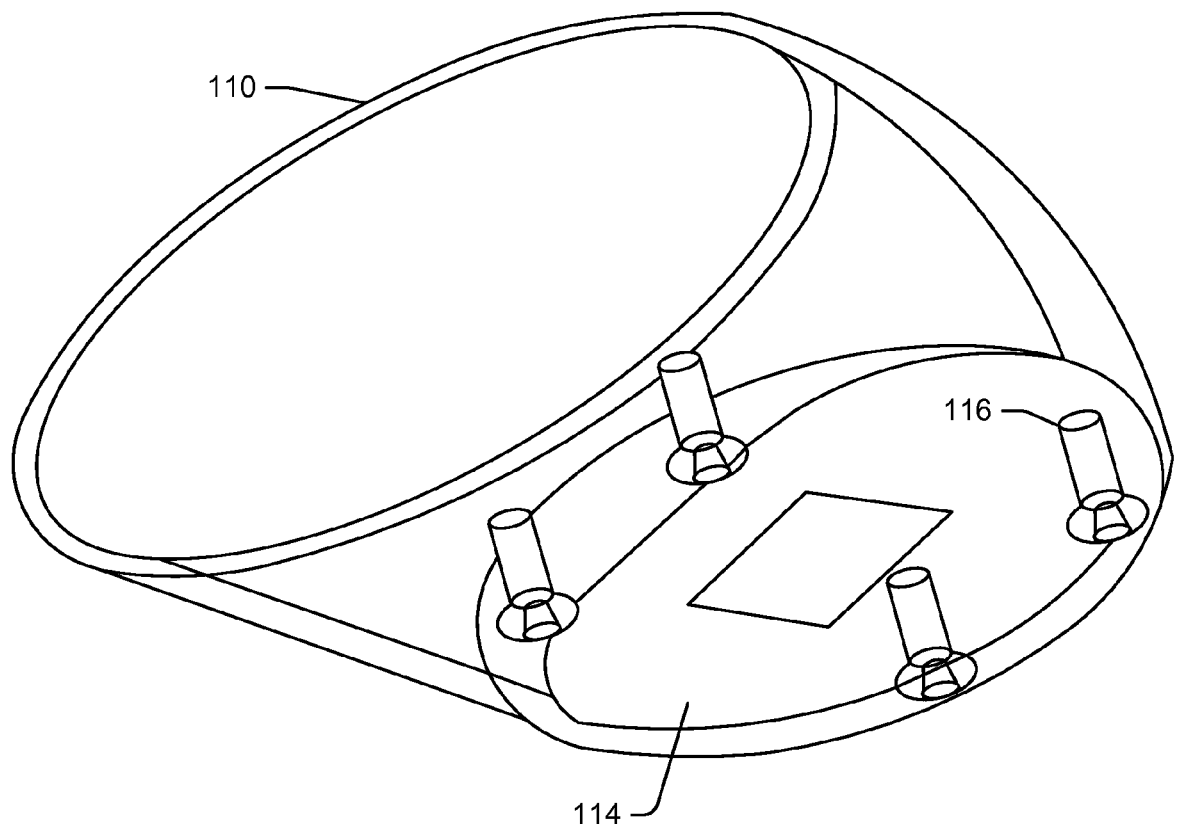
FIG. 6 schematically depicts a portion of a docking assembly in accordance with one or more embodiments of the disclosure.
Figure 7:
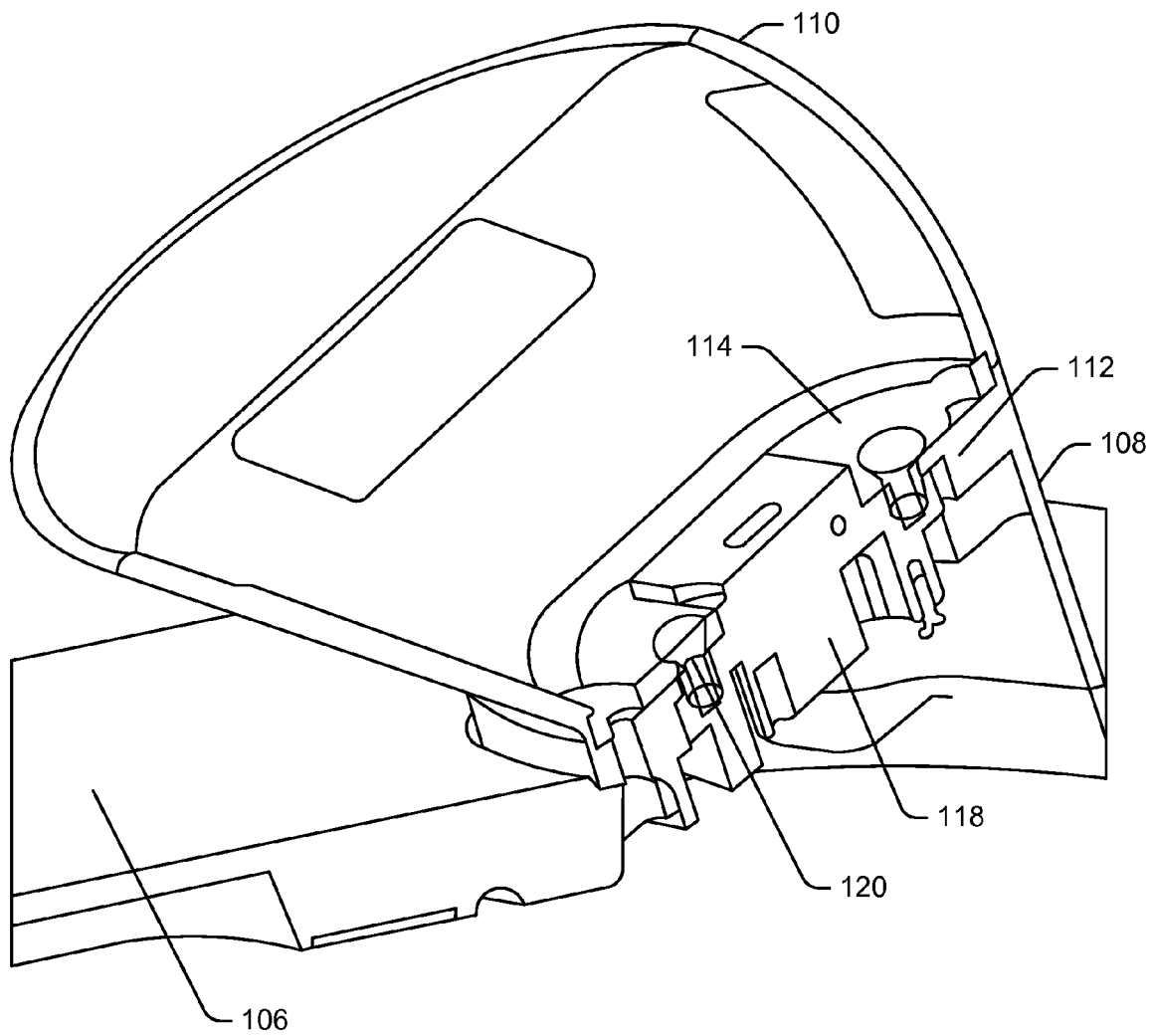
FIG. 7 schematically depicts a portion of a docking assembly in accordance with one or more embodiments of the disclosure.
Figure 8:
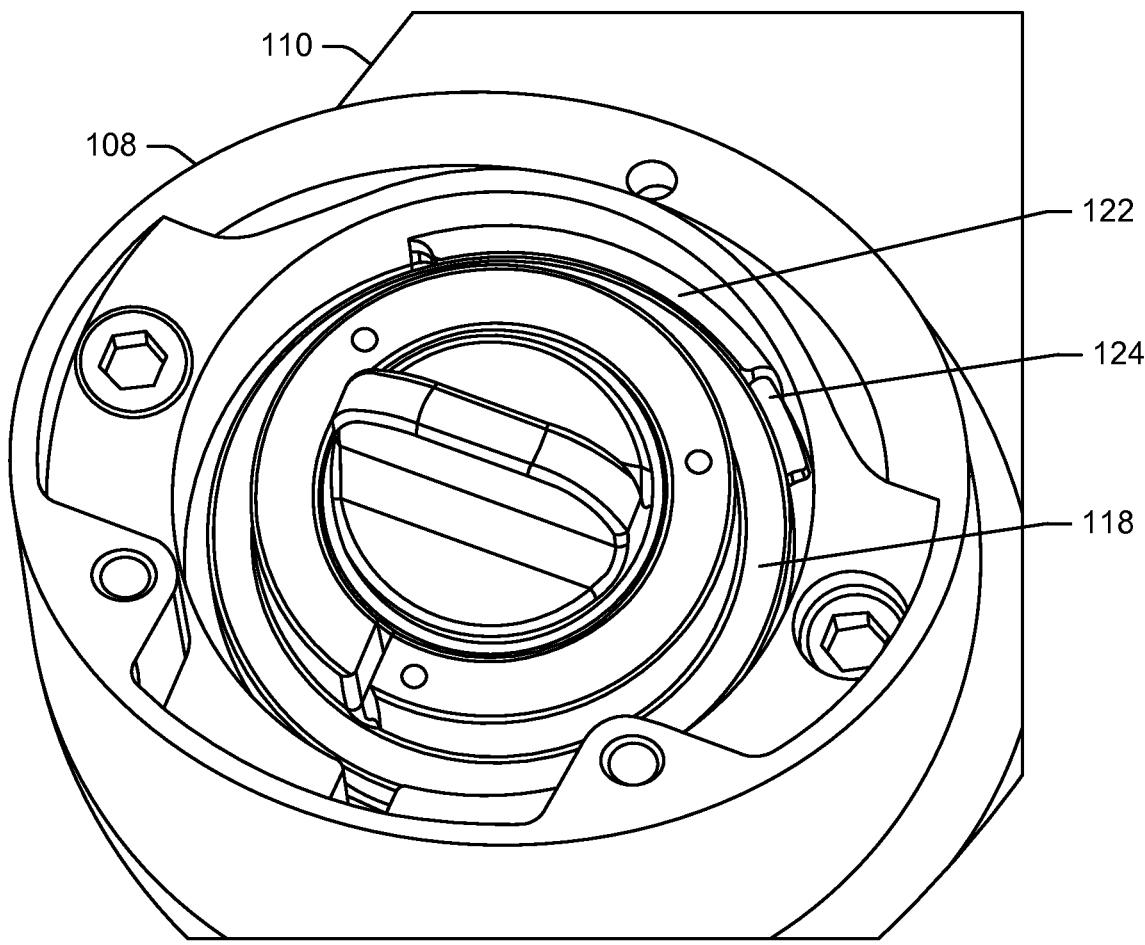
FIG. 8 schematically depicts a portion of a docking assembly in accordance with one or more embodiments of the disclosure.

As depicted in FIG. 5, the dock cup 110 may rotate relative to the tube 108. For example, as depicted in FIGS. 6-8, to facilitate rotation of the dock cup 110, a lip 112 may be disposed about an inner portion of the tube 108. In some instances, the lip 112 may be integral with the tube 108. A dock plate 114 may be attached to the dock cup 110 with four screws 116, and a dock stem 118 may be attached to the dock plate 114 with two screws 120. Any number of screws may be used. The dock plate 114 and the dock stem 118 may be positioned about the lip 112 to form a bearing surface for the dock cup 110 to rotate. In some instances, to limit the rotation of the dock cup 110, a stop block 122 may be disposed in the tube 108. In this manner, the dock stem 118 may include a tab 124 configured to engage the stop block 122 to limit rotation of the dock cup 110. For example, the dock cup 110 may be limited to 270 degrees rotation.

Figure 9:
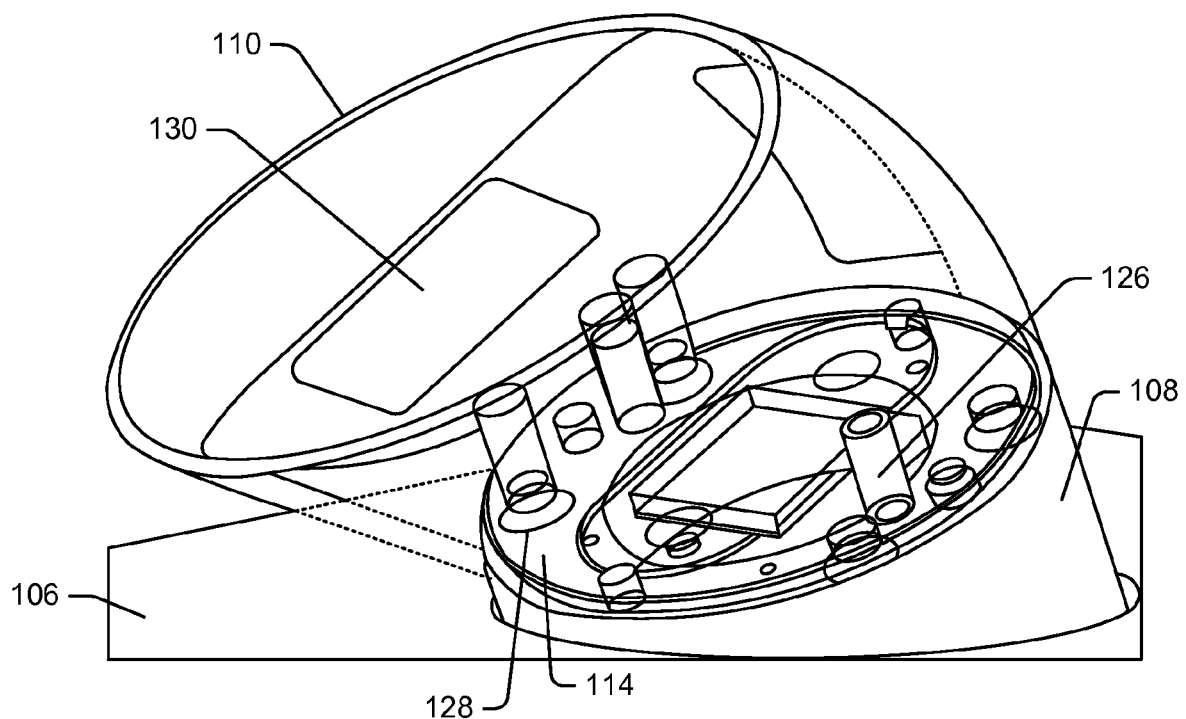
FIG. 9 schematically depicts a portion of a docking assembly in accordance with one or more embodiments of the disclosure.

FIG. 9 depicts a tactile dent assembly configured to create a tactile dent when the dock cup 110 is rotated to one or more distinct orientations. For example, the tactile dent assembly may provide a tactile dent every 90 degrees. The tactile dent assembly may include two spring plungers 126. In some instances, the spring plungers 126 may be threaded into the dock plate 114. In addition, the tube 108 may include a number of notches 128 configured to mate with the tip of the spring plungers 126 to create a tactile dent when the dock cup 110 is rotated every 90 degrees between the various portrait and landscape positions. The notches 128 may be located at any location about the tube 108.

Figure 10:
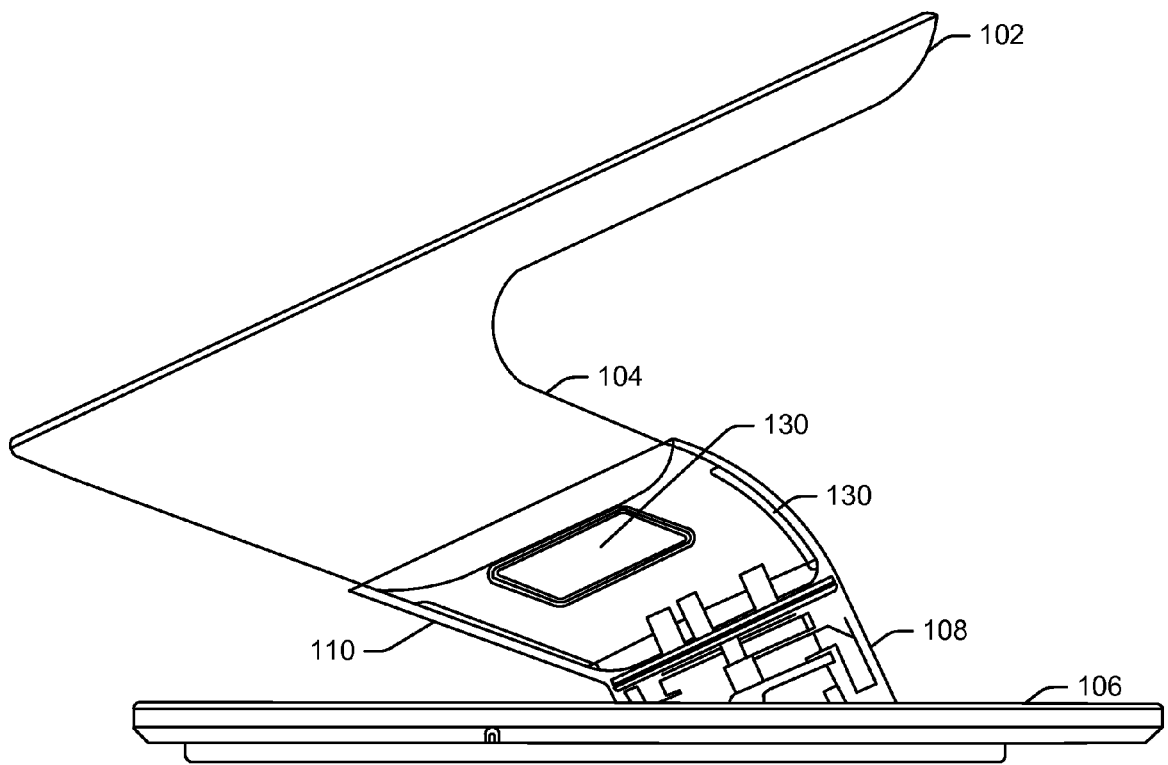
FIG. 10 schematically depicts a portion of a docking assembly in accordance with one or more embodiments of the disclosure.

The dock cup 110 may include one or more skid pads 130 disposed within the interior walls of the dock cup 110, as depicted in FIGS. 9 and 10. In some instances, the skid pads 130 may be disposed about the sides, front, and back of the interior of the dock cup 110. The skid pads 130 may provide tight tolerances between the dock cup 110 and the handle 104 to stabilize the handle 104 in the dock cup 110.

Figure 11:
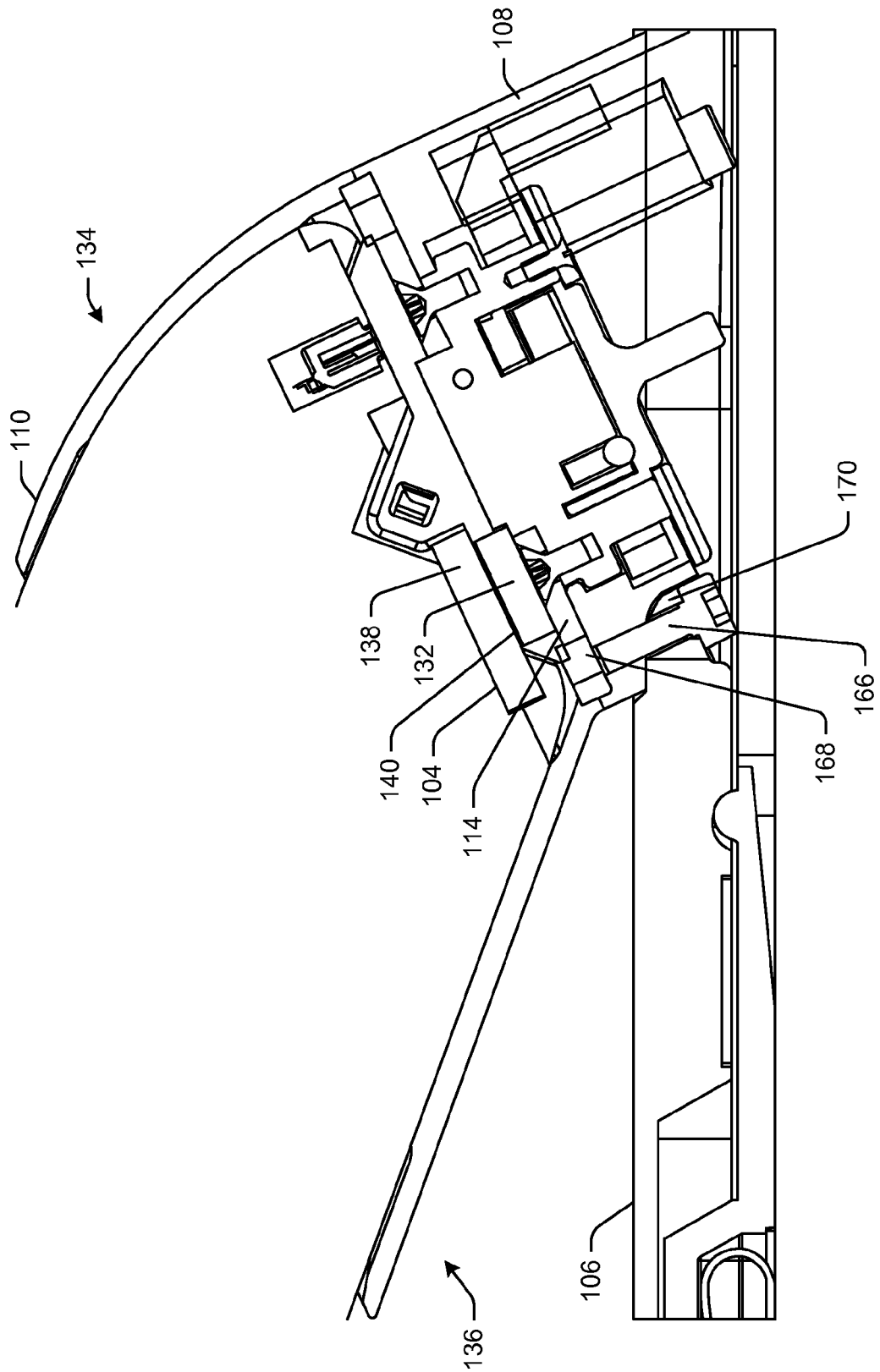
FIG. 11 schematically depicts a portion of a docking assembly in accordance with one or more embodiments of the disclosure.
Figure 12:
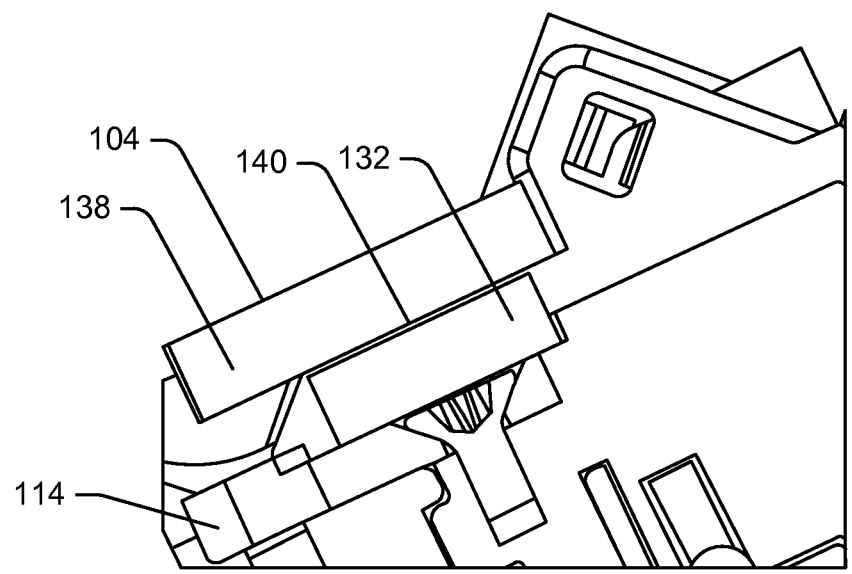
FIG. 12 schematically depicts a portion of a docking assembly in accordance with one or more embodiments of the disclosure.

As depicted in FIGS. 11 and 12, the handle 104 may be cinched into the dock cup 110 to provide stability during insertion and removal of the handle 104 from the dock cup 110. For example, a cinching magnet 132 may be disposed against the dock plate 114 within the dock cup 110. The cinching magnet 132 may be backed by the dock plate 114 to increase the attractiveness of the cinching magnet 132. In some instances, to counter instability caused by the shorter length of a back portion 134 of the dock cup 110, the cinching magnet 132 may be disposed about a front portion 136 of the dock cup 110. The handle 104 may include a magnetic material 138. The magnetic material 138 may be configured to engage the cinching magnet 132 when the handle 104 is positioned within the dock cup 110 to stabilize the handle 104 in the dock cup 110. The magnetic force between the cinching magnet 132 and the magnetic material 138 should be enough to overcome the electrical contact force and at least twice the weight of the handheld device 102 to prevent it from falling out of the dock cup 110 if upside down. Moreover, the magnetic force should not be qualitatively too hard to remove the handheld device 102. To facilitate disengaging the magnetic material 138 from the cinching magnet 132, a thin material 140 may be disposed between the cinching magnet 132 and the magnetic material 138.

Figure 13:
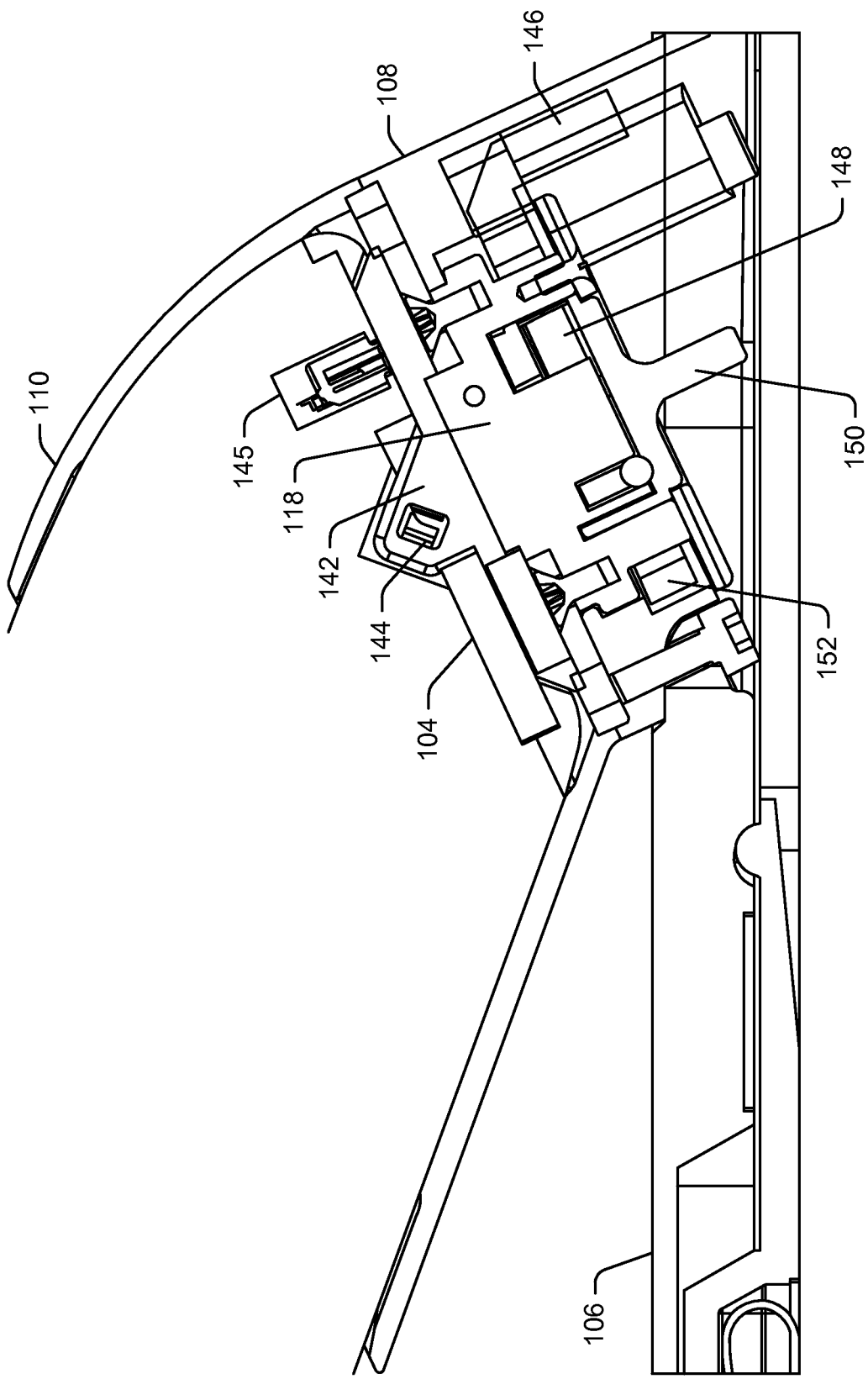
FIG. 13 schematically depicts a portion of a docking assembly in accordance with one or more embodiments of the disclosure.
Figure 14:
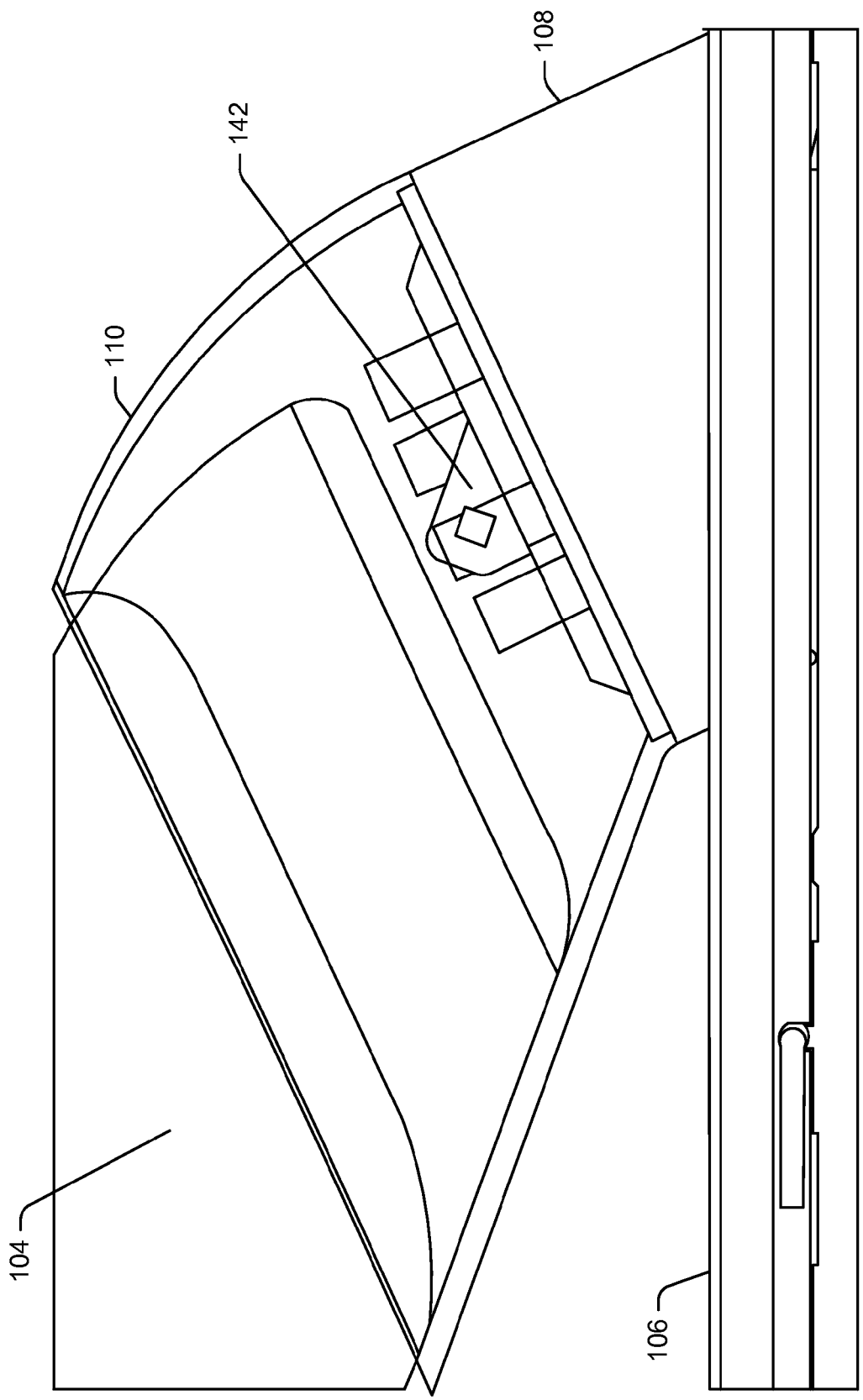
FIG. 14 schematically depicts a portion of a docking assembly in accordance with one or more embodiments of the disclosure.
Figure 15:
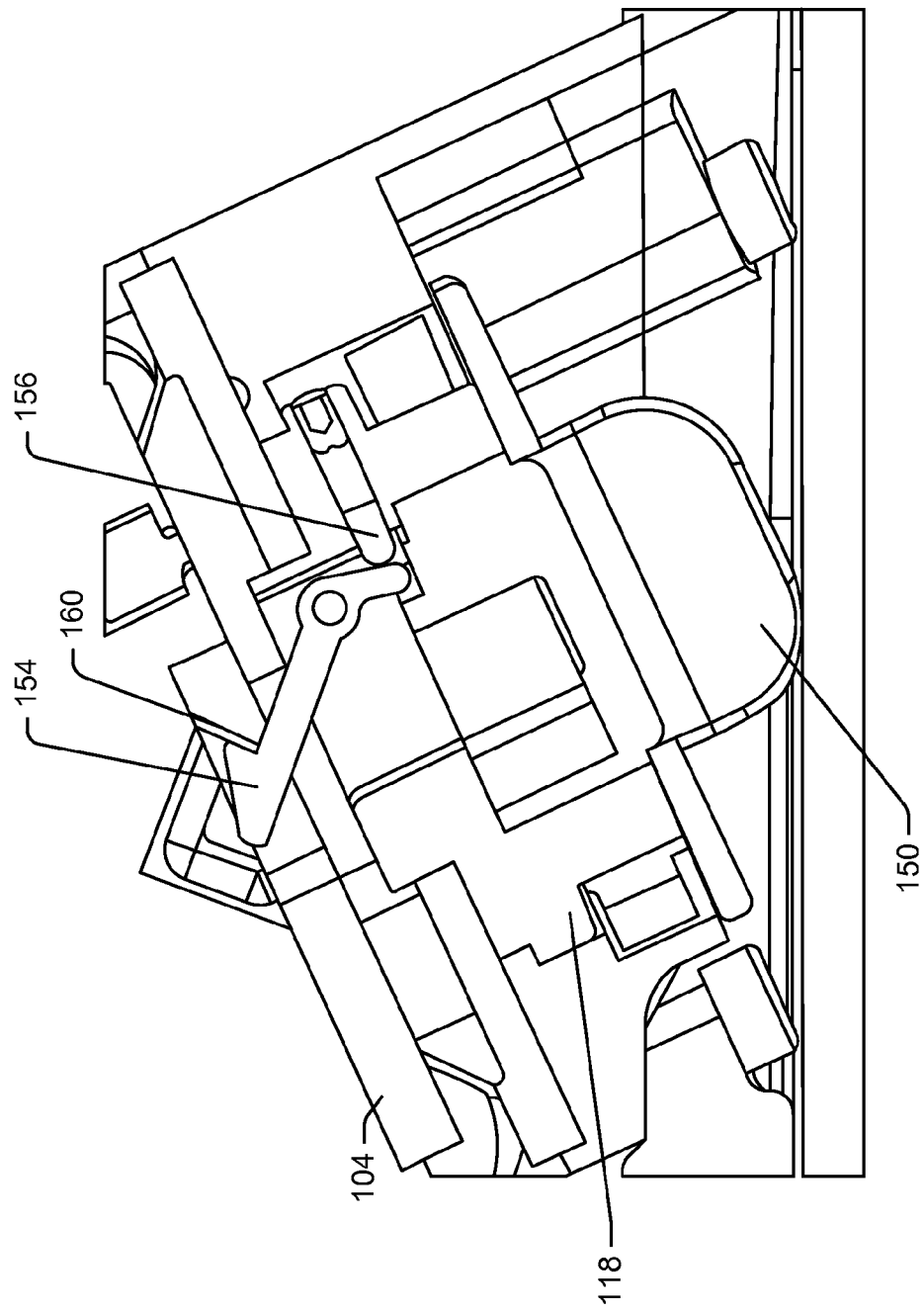
FIG. 15 schematically depicts a portion of a docking assembly in accordance with one or more embodiments of the disclosure.
Figure 16:
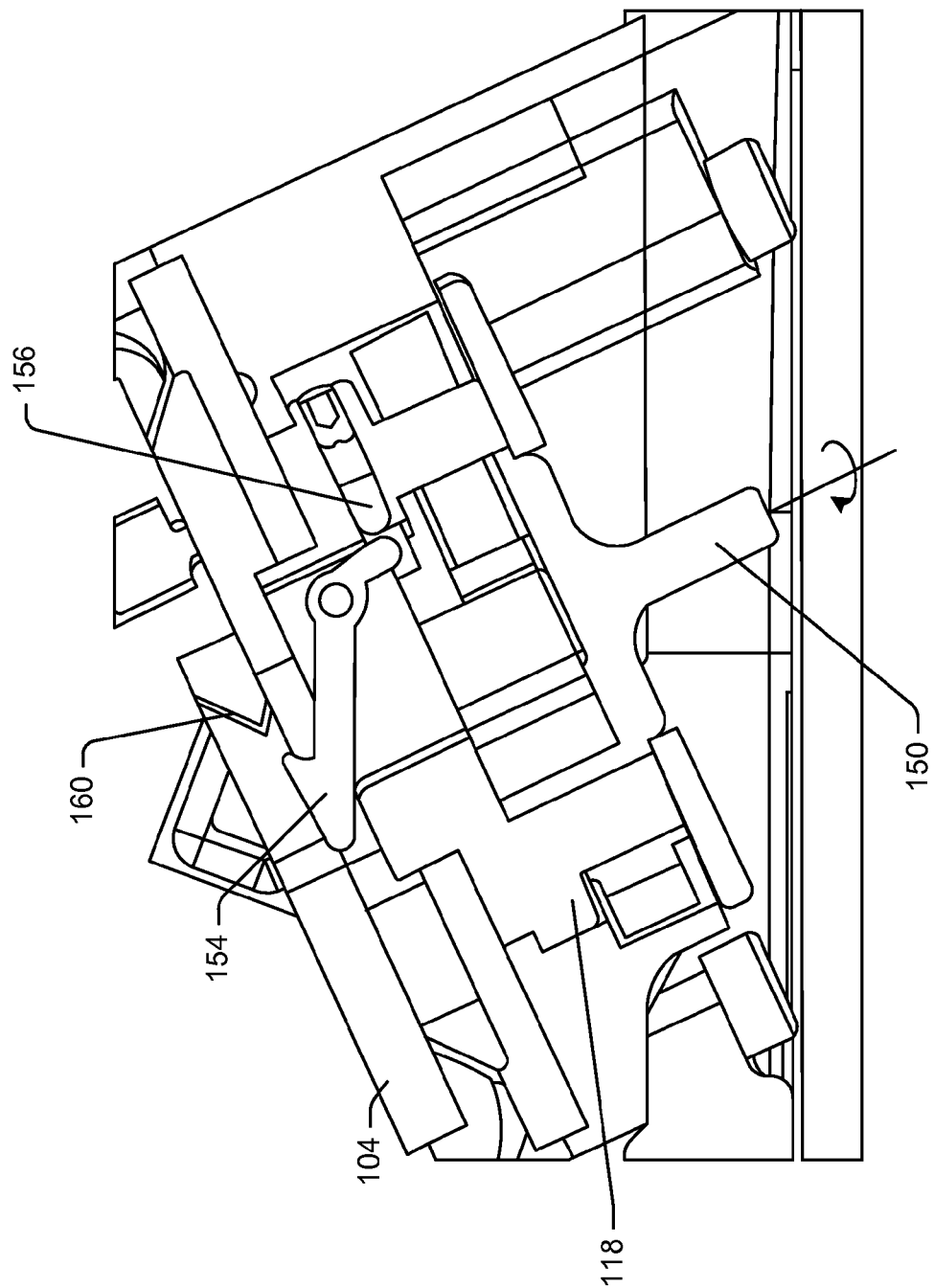
FIG. 16 schematically depicts a portion of a docking assembly in accordance with one or more embodiments of the disclosure.
Figure 17:
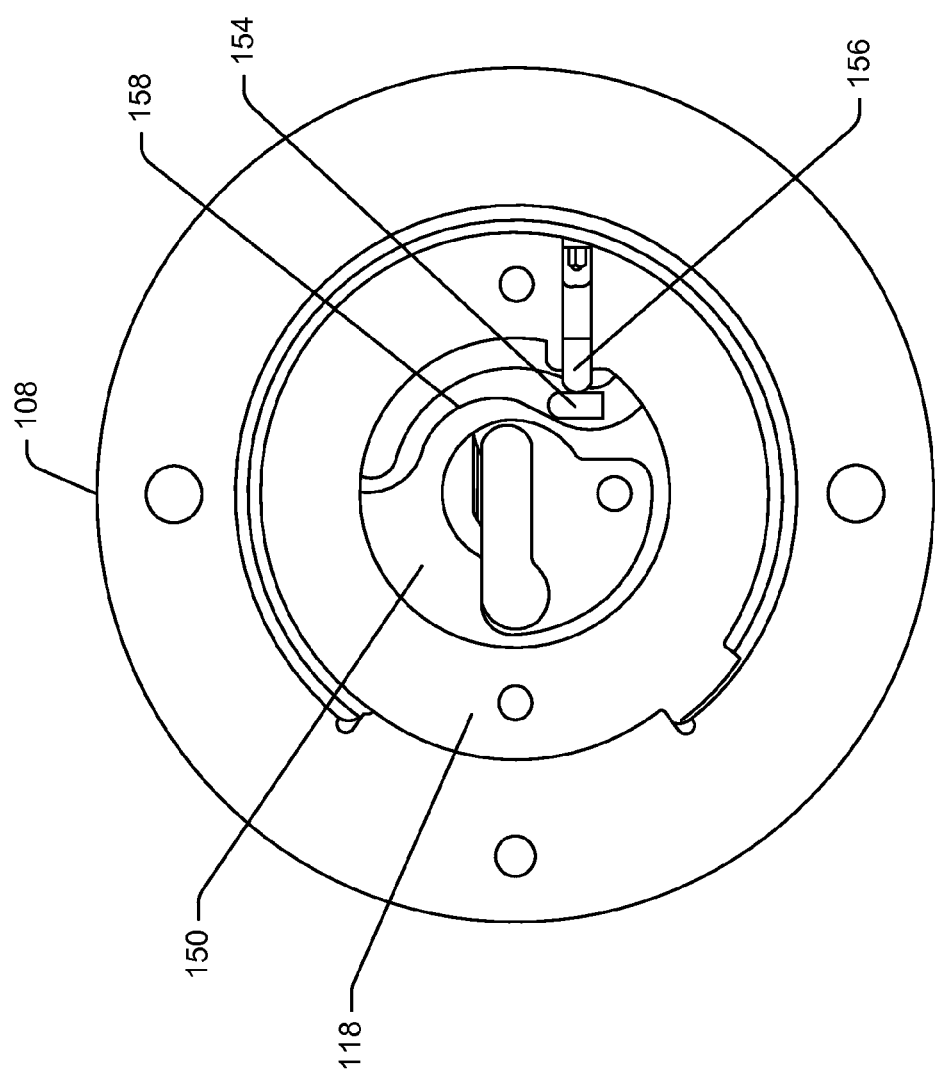
FIG. 17 schematically depicts a portion of a docking assembly in accordance with one or more embodiments of the disclosure.
Figure 18:
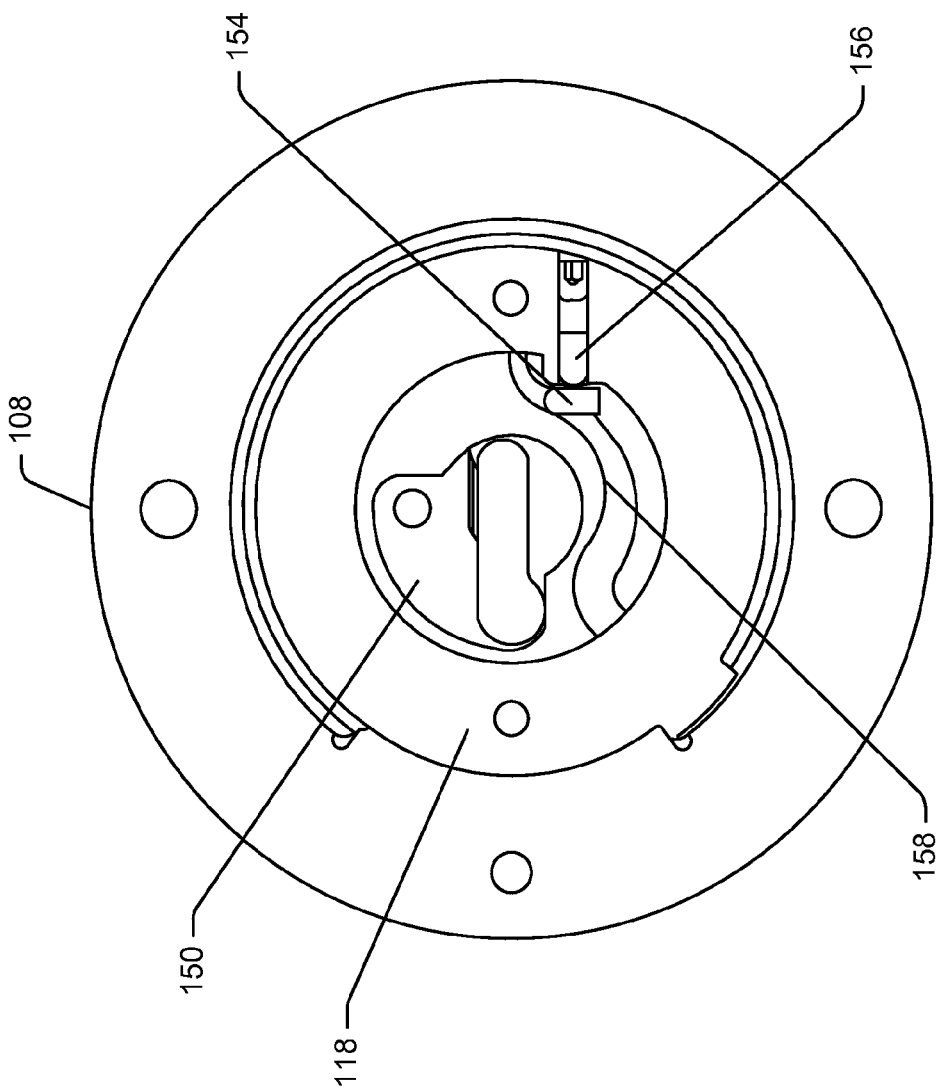
FIG. 18 schematically depicts a portion of a docking assembly in accordance with one or more embodiments of the disclosure.
Figure 19:
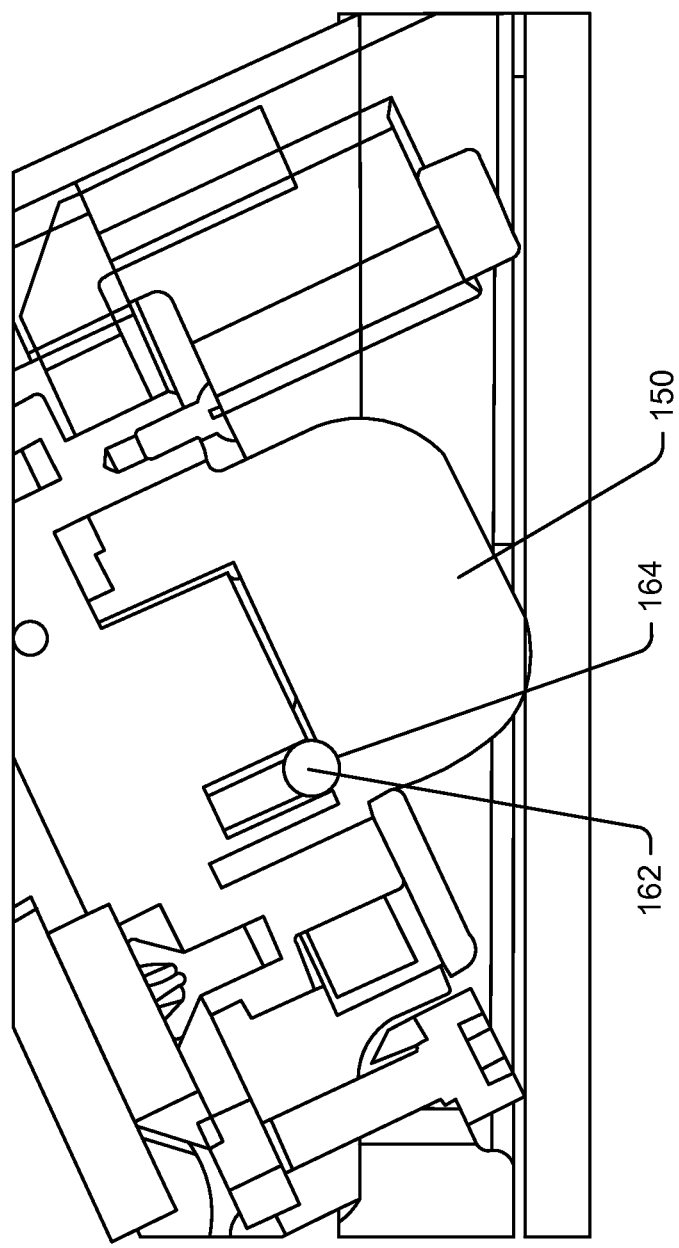
FIG. 19 schematically depicts a portion of a docking assembly in accordance with one or more embodiments of the disclosure.
Figure 20:
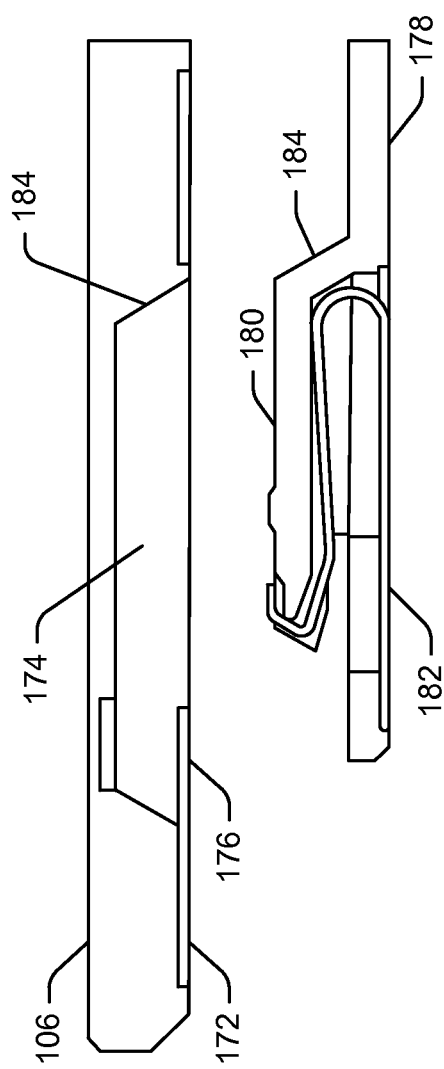
FIG. 20 schematically depicts a portion of a docking assembly in accordance with one or more embodiments of the disclosure.
Figure 21:
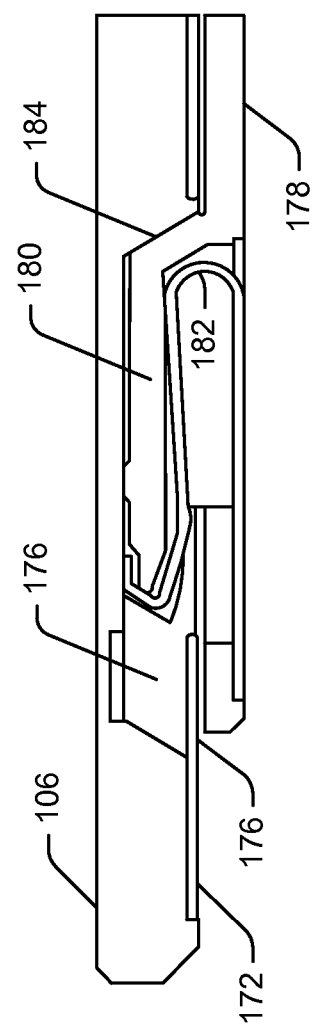
FIG. 21 schematically depicts a portion of a docking assembly in accordance with one or more embodiments of the disclosure.
Figure 22:
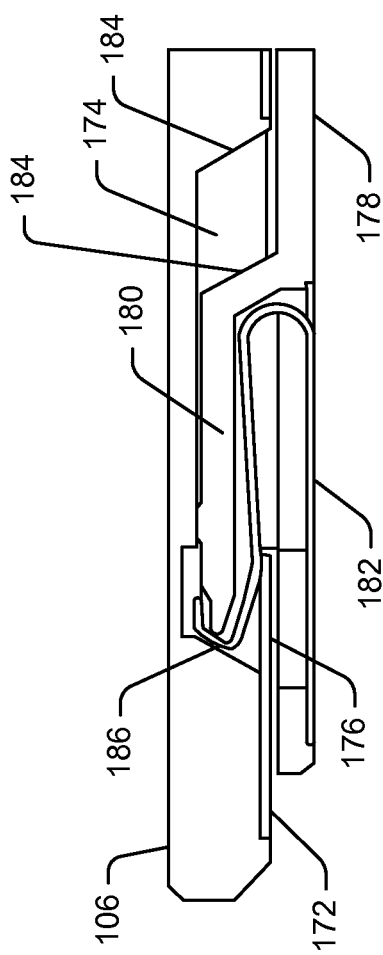
FIG. 22 schematically depicts a portion of a docking assembly in accordance with one or more embodiments of the disclosure.
Figure 23:
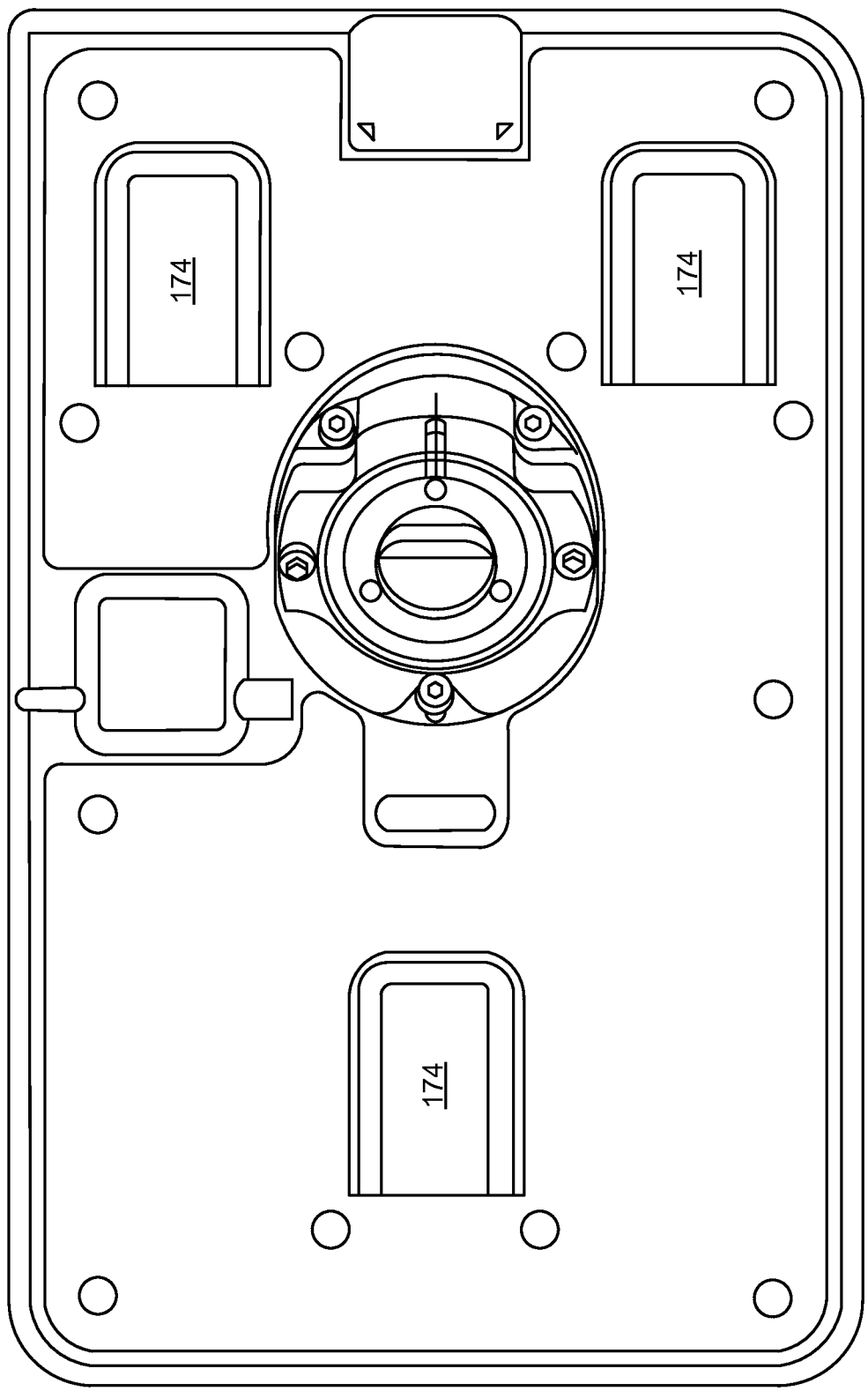
FIG. 23 schematically depicts a portion of a docking assembly in accordance with one or more embodiments of the disclosure.

The docking assembly 100 may include an electrical connection assembly, depicted in FIGS. 13 and 14, configured to mate with the handle 104 when the handle 104 is positioned within the dock cup 110. In some instances, the electrical connection assembly may provide power to the handheld device 102. For example, the electrical connection assembly may charge a power source, such as a battery, on the handheld device 102. In other instances, the electrical connection assembly may provide electrical communication between the handheld device 102 and a computing device or network. The electrical connection assembly may include any male/female coupling with the handheld device 102.

In some instances, the electrical connection assembly may include a fixed electrical connection 142 disposed within the dock cup 110. Two wiping spring contacts 144 may be disposed on opposite sides of the fixed electrical connection 142. The position of the wiping spring contacts 144 on the sides of the fixed electrical connection 142 may avoid a force balance between the cinching magnet 132 and the electrical contact force. Moreover, the wiping spring contacts 144 may mitigate contact corrosion. In some instances, additional electrical connections may be used, such as USB connectors 145 or the like. Any number of electrical connections may be used.

To accommodate the rotation of the dock cup 110, a flexible printed circuit 146 may be in communication with the fixed electrical connection 142. The flexible printed circuit 146 may extend from the fixed electrical connection 142, into and around the dock stem 118, through a window 148 in a toggle knob 150, and into the tube 108. In some instances, the flexible printed circuit 146 may include one or more loops 152 about the dock stem 118 for managing the flexible printed circuit 146 during rotation of the dock cup 110. For example, the loops 152 may expand and contract about the dock stem 118 as the dock cup 110 rotates. In some instances, the number of loops 152 may depend on the thickness of the flexible printed circuit 146, the expanded and contracted radius of the flexible printed circuit 146, and the rotation of the dock cup 110. For example, the stop block 122 and the tab 124 may prevent the dock cup 110 from over rotating and stressing the flexible printed circuit 146. In some instances, the window 148 in the toggle knob 150 may be sufficiently sized to enable the toggle knob 150 to rotate 90 degrees without interfering with the loops 152.

FIGS. 15-19 depict a first locking assembly configured to lock the handle 104 in the dock cup 110 to prevent the handle 104 from being removed from the dock cup 110. The first locking assembly may include a latch 154 pivotally attached to the dock stem 118. The latch 154 may include a locked position and an unlocked position. In the locked position, the latch 154 may act as a slam latch. A spring pin 156 may be disposed within the dock stem 118. The spring pin 156 also may be in communication with the latch 154. The spring pin 156 may be configured to bias the latch 154 in the locked position. The toggle knob 150 may be in rotatable communication with the dock stem 118. The toggle knob 150 may be accessed from beneath the base 106. The toggle knob 150 may include a cam surface 158 in communication with the latch 154. In this manner, rotation of the toggle knob 150 may move the latch 154 between the locked position and the unlocked position. The handle 104 may include a slot 160 configured to engage the latch 154 in the locked position. For example, when the handle 104 is inserted into the dock cup 110, the handle 104 may rotate the latch 154 against the force of the spring pin 156 into the slot 160. Once the latch 154 is positioned within the slot 160, the spring pin 156 may push the latch 154 to the locked position. In some instances, the latch 154 may include a negative lead in angle to reinforce latching.

In some instances, the first locking assembly may include a tactile dent assembly to create a tactile dent when the toggle knob 150 is rotated between the locked position and the unlocked position. The tactile dent assembly may include a ball plunger 162 disposed in the dock stem 118. Notches 164 in the toggle knob 150 may be configured to mate with the ball plunger 162 to create a tactile dent between the locked position and the unlocked position. For example, two notches 164 may be spaced 90 degrees apart.

Referring back to FIG. 11, the docking assembly 100 also may include a second locking assembly configured to lock the orientation of the dock cup 110 to prevent rotation of the dock cup 110. In some instances, the second locking assembly may include captive screws 166 disposed in the tube 108. In certain embodiments, two diametrically opposed captive screws 166 may be used to avoid an unbalanced locking force. Any number of captive screws 166 may be used. The captive screws 166 may include a locked position to prevent rotation of the dock cup 110 and an unlocked position where the dock cup 110 is rotatable about the tube 108. A number of holes 168 in the dock plate 114 may be configured to receive the captive screws 166 when in the locked position. In some instances, a captive screw spring 170 may be configured to bias the captive screws 166 in the unlocked position. For example, the captive screw spring 170 may push the head of the captive screws 166 away from the dock plate 114 when the captive screws 166 are in the unlocked position. The captive screw spring 170 may enable the dock cup 110 to rotate freely without unintended interference from the captive screws 166.

As depicted in FIGS. 20-23, to mount the docking assembly to a surface, such as a counter or a wall, the docking assembly may include a cover plate 172 attached to the base 106. The cover plate 172 may conceal and protect various wires and electronics disposed in the base 106. The base 106 may include a number of cavities 174 formed therein. For example, the cavities 174 may include three triangularly spaced apart cavities 174. The cover plate 172 may form an undercut 176 about each of the cavities 174. A bracket 178 may be configured to mate with the base 106. In some instances, the bracket 178 may be attached to a surface, such as a counter or a wall. The bracket 178 may include a number of clip protrusions 180 configured to mate with the cavities 174 and the undercut 176. A bracket spring clip 182 may be configured to cinch the base 106 to the bracket 178. In some instances, the cavities 174 and the clip protrusions 180 may include corresponding angled walls 184 for aligning the base 106 and the bracket 178. Once positioned within the cavities 174, the clip protrusions 180 may be slid into place. The clip protrusions 180 may engage a hard stop 186. The hard stop 186 may be configured to counter forces from tapping on the display. Moreover, the hard stop 186 may counteract the weight of the docking assembly 100 hanging on a wall.

Figure 24:
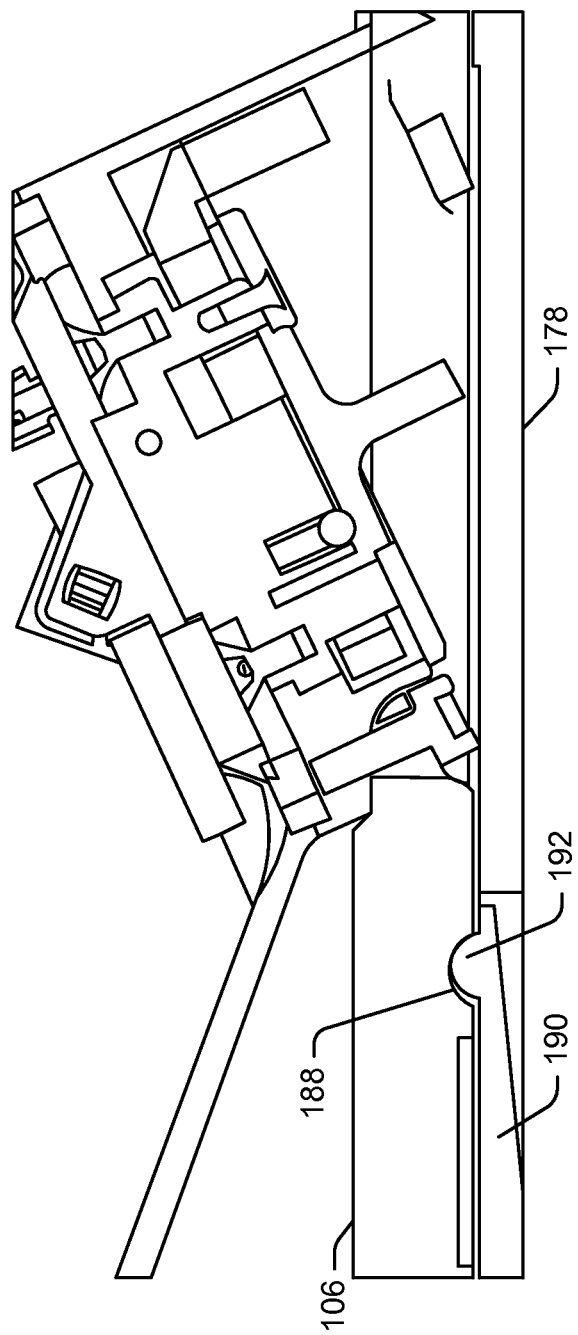
FIG. 24 schematically depicts a portion of a docking assembly in accordance with one or more embodiments of the disclosure.
Figure 25:
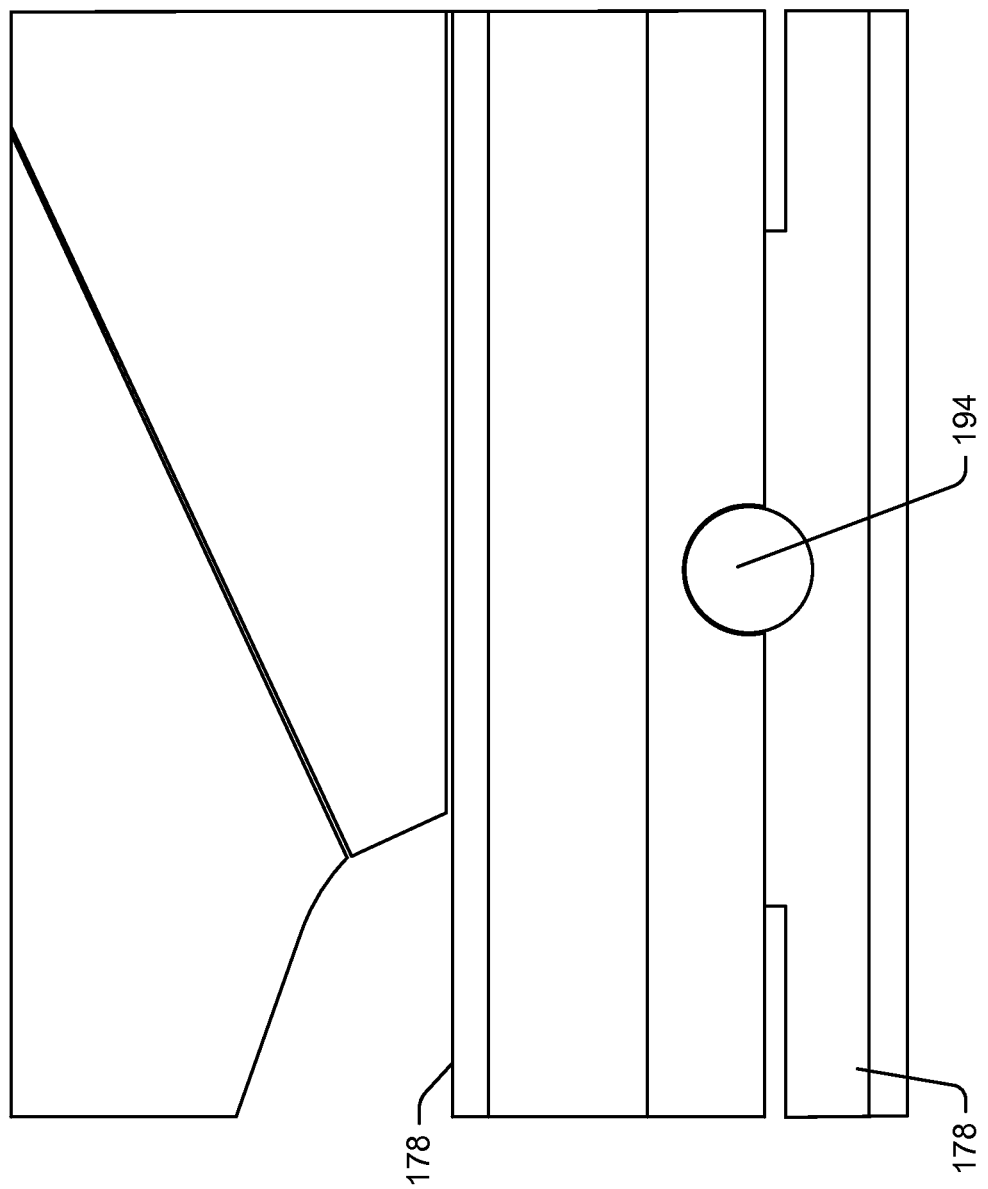
FIG. 25 schematically depicts a portion of a docking assembly in accordance with one or more embodiments of the disclosure.

As depicted in FIGS. 24 and 25, the base 106 may include a notch 188, and the bracket 178 may include a flexure beam 190 having a dent 192 at its free end. The dent 192 may be configured to mate with the notch 188 as the bracket 178 is slid into the base 106 to create a tactile dent. Moreover, the dent 192 and the notch 188 may retain the base 106 in place as the handheld device 102 is inserted and removed from the dock cup 110. In addition, a set screw 194 may be configured to fasten the base 106 to the bracket 178. The set screw 194 may prevent the base 106 and the bracket 178 from sliding relative to one another.

Illustrative Methods

Figure 26:
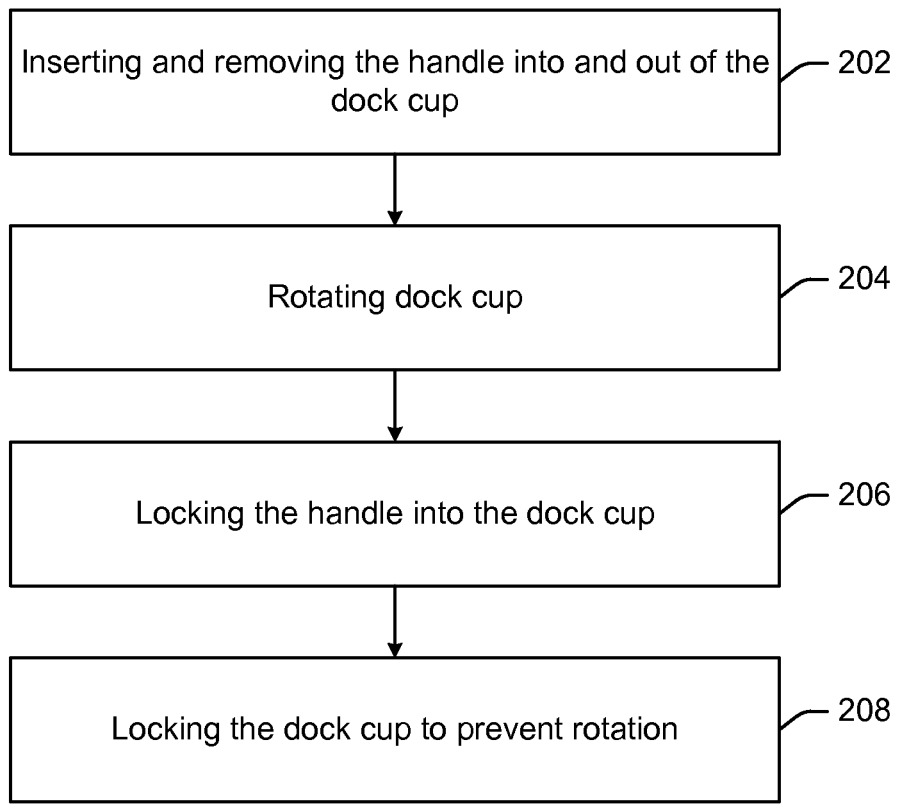
FIG. 26 is a flow diagram depicting an illustrative method for docking a handheld device comprising a handle into a docking assembly in accordance with one or more embodiments of the disclosure.

FIG. 26 is a flow diagram depicting an illustrative method 200 for docking a handheld device 102 comprising a handle 104 into a docking assembly 100 shown in FIGS. 1-25 in accordance with one or more embodiments of the disclosure. In certain embodiments, the docking assembly 100 may provide improved stability, maneuverability, and/or configurability.

At block 202 of the method 200, the handle 104 may be inserted and removed from the dock cup 110. In some instances, the dock cup 110 may include one or more skid pads 130 disposed within the interior walls of the dock cup 110. The skid pads 130 may be disposed about the sides, front, and back of the interior of the dock cup 110. The skid pads 130 may provide tight tolerances between the dock cup 110 and the handle 104 to stabilize the handle 104 in the dock cup 110.

During insertion and removal of the handle 104 from the dock cup 110, the handle 104 may be cinched into the dock cup 110 to provide stability. For example, a cinching magnet 132 may be disposed against the dock plate 114 within the dock cup 110. The cinching magnet 132 may be backed by the dock plate 114 to increase the attractiveness of the cinching magnet 132. In some instances, to counter instability caused by the shorter length of a back portion 134 of the dock cup 110, the cinching magnet 132 may be disposed about a front portion 136 of the dock cup 110. The handle 104 may include a magnetic material 138. The magnetic material 138 may be configured to engage the cinching magnet 132 when the handle 104 is positioned within the dock cup 110 to stabilize the handle 104 in the dock cup 110. The magnetic force between the cinching magnet 132 and the magnetic material 138 should be enough to overcome the electrical contact force and at least twice the weight of the handheld device 102 to prevent it from falling out of the dock cup 110 if upside down. Moreover, the magnetic force should not be qualitatively too hard to remove the handheld device 102. To facilitate disengaging the magnetic material 138 from the cinching magnet 132, a thin material 140 may be disposed between the cinching magnet 132 and the magnetic material 138.

The dock cup 110 may be rotated at block 204 of the method 200. For example, a lip 112 may be disposed about an inner portion of the tube 108. In some instances, the lip 112 may be integral with the tube 108. A dock plate 114 may be attached to the dock cup 110 with four screws 116, and a dock stem 118 may be attached to the dock plate 114 with two screws 120. The dock plate 114 and the dock stem 118 may be positioned about the lip 112 to form a bearing surface for the dock cup 110 to rotate. In some instances, to limit the rotation of the dock cup 110, a stop block 122 may be disposed in the tube 108. In this manner, the dock stem 118 may include a tab 124 configured to engage the stop block 122 to limit rotation of the dock cup 110. For example, the dock cup 110 may be limited to 270 degrees rotation.

A tactile dent assembly may create a tactile dent when the dock cup 110 is rotated to one or more distinct orientations. For example, the tactile dent assembly may provide a tactile dent every 90 degrees. The tactile dent assembly may include two spring plungers 126. In some instances, the spring plungers 126 may be threaded into the dock plate 114. In addition, the tube 108 may include a number of notches 128 configured to mate with the tip of the spring plungers 126 to create a tactile dent when the dock cup 110 is rotated every 90 degrees between the various portrait and landscape positions. The notches 128 may be located at any location about the tube 108.

At block 206 of the method 200, the handle 104 may be locked in the dock cup 110 to prevent the handle 104 from being removed from the dock cup 110. For example, the docking assembly 100 may include a first locking assembly. The first locking assembly may include a latch 154 pivotally attached to the dock stem 118. The latch 154 may include a locked position and an unlocked position. In the locked position, the latch 154 may act as a slam latch. A spring pin 156 may be disposed within the dock stem 118. The spring pin 156 also may be in communication with the latch 154. The spring pin 156 may be configured to bias the latch 154 in the locked position. The toggle knob 150 may be in rotatable communication with the dock stem 118. The toggle knob 150 may include a cam surface 158 in communication with the latch 154. In this manner, rotation of the toggle knob 150 may move the latch 154 between the locked position and the unlocked position. The handle 104 may include a slot 160 configured to engage the latch 154 in the locked position. For example, when the handle 104 is inserted into the dock cup 110, the handle 104 may rotate the latch 154 against the force of the spring pin 156 into the slot 160. Once the latch 154 is positioned within the slot 160, the spring pin 156 may push the latch 154 to the locked position. In some instances, the latch 154 may include a negative lead in angle to reinforce latching.

In some instances, the first locking assembly may include a tactile dent assembly to create a tactile dent when the toggle knob 150 is rotated between the locked position and the unlocked position. The tactile dent assembly may include a ball plunger 162 disposed in the dock stem 118. Two notches 164 in the toggle knob 150 may be configured to mate with the ball plunger 162 to create a tactile dent between the locked position and the unlocked position. For example, the two notches 164 may be spaced 90 degrees apart.

At block 208 of the method 200, the dock cup 110 may be locked to prevent rotation of the dock cup 110. For example, the docking assembly 100 may include a second locking assembly. In some instances, the second locking assembly may include captive screws 166 disposed in the tube 108. In certain embodiments, two diametrically opposed captive screws 166 may be used to avoid an unbalanced locking force. The captive screws 166 may include a locked position to prevent rotation of the dock cup 110 and an unlocked position where the dock cup 110 is rotatable about the tube 108. A number of holes 168 in the dock plate 114 may be configured to receive the captive screws 166 when in the locked position. In some instances, a captive screw spring 170 may be configured to bias the captive screws 166 in the unlocked position. For example, the captive screw spring 170 may push the head of the captive screws 166 away from the dock plate 114 when the captive screws 166 are in the unlocked position. The captive screw spring 170 may enable the dock cup 110 to rotate freely without unintended interference from the captive screws 166.

The operations described in blocks 202-208 of the method 200 may be performed in any order. Moreover, certain operations may be omitted, while other operations may be added.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

That which is claimed is:

1. A system, comprising:
a handheld device comprising a handle; and
a docking assembly, comprising:
   a base;
   a tube extending from the base;
   a dock cup in rotatable communication with the tube, wherein the dock cup is configured to mate with the handle;
   an electrical connection assembly configured to mate with the handle when the handle is positioned within the dock cup;
   a first locking assembly configured to lock the handle in the dock cup to prevent the handle from being removed from the dock cup;
   a second locking assembly configured to lock the orientation of the dock cup to prevent rotation of the dock cup;
   a lip formed about an inner portion of the tube;
   a dock plate attached to the dock cup; and
   a dock stem attached to the dock plate, wherein the dock plate and the dock stem are positioned about the lip to form a bearing surface for the dock cup to rotate.

2. The system of claim 1, wherein the electrical connection assembly comprises:
   a fixed electrical connection disposed within the dock cup;
   at least one wiping spring contact disposed on a side of the fixed electrical connection; and
   a flexible printed circuit in communication with the fixed electrical connection, wherein the flexible printed circuit extends from the fixed electrical connection, into and around the dock stem, through a window in a toggle knob, and into the tube.

3. The system of claim 2, wherein the flexible printed circuit comprises at least one loop about the dock stem for managing the flexible printed circuit during rotation of the dock cup by expanding and contracting the flexible printed circuit as the dock cup rotates.

4. The system of claim 1, further comprising:
   at least one spring plunger attached to the dock plate; and
   at least one notch in the tube configured to mate with the at least one spring plunger to create a tactile dent when the dock cup is rotated to at least one distinct orientation.

5. The system of claim 1, wherein the second locking assembly comprises:
   at least one captive screw disposed in the tube, wherein the at least one captive screw comprises a locked position to prevent rotation of the dock cup and an unlocked position where the dock cup is rotatable about the tube;
   at least one hole in the dock plate configured to receive the at least one captive screw when in the locked position; and
   a captive screw spring configured to bias the at least one captive screw in the unlocked position.

6. The system of claim 1, further comprising:
a stop block in the tube portion; and
a tab on the dock stem configured to engage the stop block to limit rotation of the dock cup.

7. The system of claim 1, further comprising:
a cinching magnet disposed against the dock plate within the dock cup;
a magnetic material disposed within the handle, wherein the magnetic material is configured to engage the cinching magnet when the handle is positioned within the dock cup to stabilize the handle in the dock cup; and
a thin material disposed between the cinching magnet and the magnetic material to facilitate disengaging the magnetic material from the cinching magnet.

8. The system of claim 1, further comprising one or more skid pads disposed within the dock cup to stabilize the handle in the dock cup.

9. The system of claim 1, wherein the first locking assembly comprises:
   a latch pivotally attached to the dock stem and comprising a locked position and an unlocked position;
   a spring pin disposed within the dock stem and in communication with the latch, wherein the spring pin is configured to bias the latch in the locked position;
   a toggle knob in rotatable communication with the dock stem and comprising a cam surface in communication with the latch, wherein rotation of the toggle knob moves the latch between the locked position and the unlocked position; and
   a slot in the handle configured to engage the latch in the locked position.

10. The system of claim 9, wherein the first locking assembly comprises:
   a ball plunger disposed in the dock stem; and
   at least one notch in the toggle knob configured to mate with the at least one ball plunger to create a tactile dent between the locked position and the unlocked position.

11. The system of claim 1, further comprising:
   a cover plate attached to the base;
   at least one cavity formed within the base;
   an undercut formed about the at least one cavity by the cover plate;
   a bracket comprising at least one clip protrusion, wherein the at least one clip protrusion is configured to mate with the at least one cavity and the undercut; and
   a bracket spring clip configured to cinch the base to the bracket.

12. The system of claim 11, wherein the at least one cavity and the at least one clip protrusion comprise corresponding angled walls for aligning the base and the bracket.

13. The system of claim 11, further comprising:
   at least one notch in the base;
   at least one flexure beam in the bracket; and
   at least one dent on the at least one flexure beam, wherein the at least one dent is configured to mate with the at least one notch.

14. The system of claim 11, further comprising at least one set screw for fastening the base to the bracket.

15. A system, comprising:
a handheld device comprising a handle; and
a docking assembly, comprising:
   a base;
   a tube extending from the base;
   a dock cup in rotatable communication with the tube, wherein the dock cup is configured to mate with the handle;
   an electrical connection assembly configured to mate with the handle when the handle is positioned within the dock cup;
   a first locking assembly configured to lock the handle in the dock cup to prevent the handle from being removed from the dock cup;
   a second locking assembly configured to lock the orientation of the dock cup to prevent rotation of the dock cup; and
   a tactile dent assembly configured to create a tactile dent when the dock cup is rotated to at least one distinct orientation.

16. The system of claim 15, further comprising a stop assembly configured to limit rotation of the dock cup.

17. The system of claim 15, further comprising a cinching assembly configured to stabilize the handle in the dock cup.

18. A system, comprising:
- a handheld device comprising a handle; and
- a docking assembly, comprising:
  - a base;
  - a tube extending from the base;
  - a dock cup in rotatable communication with the tube, wherein the dock cup is configured to mate with the handle;
  - an electrical connection assembly configured to mate with the handle when the handle is positioned within the dock cup;
  - a first locking assembly configured to lock the handle in the dock cup to prevent the handle from being removed from the dock cup;
  - a second locking assembly configured to lock the orientation of the dock cup to prevent rotation of the dock cup; and
  - a cinching assembly configured to stabilize the handle in the dock cup.

\* \* \* \* \*